US011677557B1

(12) United States Patent
Tree et al.

(10) Patent No.: US 11,677,557 B1
(45) Date of Patent: Jun. 13, 2023

(54) VALUE PREFERENCE CAPTURE FUNNEL AND CODING SYSTEM

(71) Applicant: Codebreaker IP Reserves, LLC, Las Vegas, NV (US)

(72) Inventors: Cherianne Tree, Laguna Beach, CA (US); Omar F. Sayed, Chandler, AZ (US); Arthur L. McCracken, Couer d'Alene, ID (US)

(73) Assignee: Codebreaker IP Reserves, LLC

( * ) Notice: Subject to any disclaimer, the term of this patent is extended or adjusted under 35 U.S.C. 154(b) by 0 days.

(21) Appl. No.: 17/728,201

(22) Filed: Apr. 29, 2022

(51) Int. Cl.
*H04L 9/32* (2006.01)
*G06F 21/12* (2013.01)
*H04L 9/08* (2006.01)

(52) U.S. Cl.
CPC .......... *H04L 9/3226* (2013.01); *G06F 21/121* (2013.01); *H04L 9/0825* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 7,409,208 B1 * | 8/2008 | Clare ................. | G06Q 30/0603 709/219 |
| 8,539,043 B2 | 9/2013 | McCollum et al. | |
| 9,413,710 B1 | 8/2016 | Saylor et al. | |
| 10,439,918 B1 * | 10/2019 | Riggs .................. | G06Q 10/107 |
| 10,587,423 B2 | 3/2020 | Nagaratnam et al. | |
| 10,666,659 B2 * | 5/2020 | Treleaven ............. | H04L 63/102 |
| 10,891,365 B2 | 1/2021 | Komnata et al. | |
| 10,984,034 B1 | 4/2021 | Sandland et al. | |
| 2008/0271119 A1 | 10/2008 | Manne et al. | |
| 2010/0057743 A1 * | 3/2010 | Pierce .................... | G06Q 30/02 707/E17.134 |
| 2010/0169803 A1 * | 7/2010 | Mazzei .................. | G06Q 30/02 715/764 |
| 2011/0276408 A1 | 11/2011 | Toole | |
| 2014/0082055 A1 * | 3/2014 | Achan, Jr. ............. | H04L 67/535 709/203 |
| 2014/0214534 A1 * | 7/2014 | L'Heureux ........ | G06Q 30/0252 705/14.64 |

(Continued)

FOREIGN PATENT DOCUMENTS

| | | |
|---|---|---|
| IN | 201941008856 A | 9/2020 |
| WO | WO2014018096 | 1/2014 |

OTHER PUBLICATIONS

A three page series of screenshots depicting a webpage from top to bottom taken from https://www.crackmycode.com/# on Apr. 25, 2022.

(Continued)

*Primary Examiner* — Bassam A Noaman

(74) *Attorney, Agent, or Firm* — Advantage IP Law Firm

(57) ABSTRACT

A system and method for capturing value preference based data from a requestor of one or more digital content presentations during an access sequence and transforming the captured data into a useful tool enabling the content provider to modify the user experience prior to or subsequent to granting access to the requested content resulting in a more efficient and tailored interaction between the requestor and the content provider.

28 Claims, 21 Drawing Sheets

(56) References Cited

U.S. PATENT DOCUMENTS

| | | | |
|---|---|---|---|
| 2015/0089357 A1* | 3/2015 | Vandervort | G06F 21/62 |
| | | | 715/256 |
| 2016/0365006 A1* | 12/2016 | Minturn | G16H 10/60 |
| 2017/0039988 A1* | 2/2017 | Whiting | G06F 3/0482 |
| 2017/0337838 A1* | 11/2017 | Elkon | G06F 3/013 |
| 2019/0163710 A1* | 5/2019 | Haghighat Kashani | |
| | | | G06F 16/24578 |
| 2020/0286110 A1 | 9/2020 | Wood et al. | |
| 2020/0311688 A1* | 10/2020 | Lipman | H04L 9/0637 |
| 2020/0320558 A1* | 10/2020 | Mestres | G06Q 30/0203 |
| 2021/0158378 A1* | 5/2021 | Jones | G16H 20/30 |
| 2021/0233121 A1 | 7/2021 | Reddy | |
| 2022/0058707 A1* | 2/2022 | Herling | G06Q 30/0617 |
| 2022/0066847 A1* | 3/2022 | Liu | G06F 9/541 |

OTHER PUBLICATIONS

Abstract taken from conference paper entitled Predicting Personality Traits from Touchscreen Based Interactions, (IEEE, Kuster et al.), published in 2018.

* cited by examiner

FIG. 5C

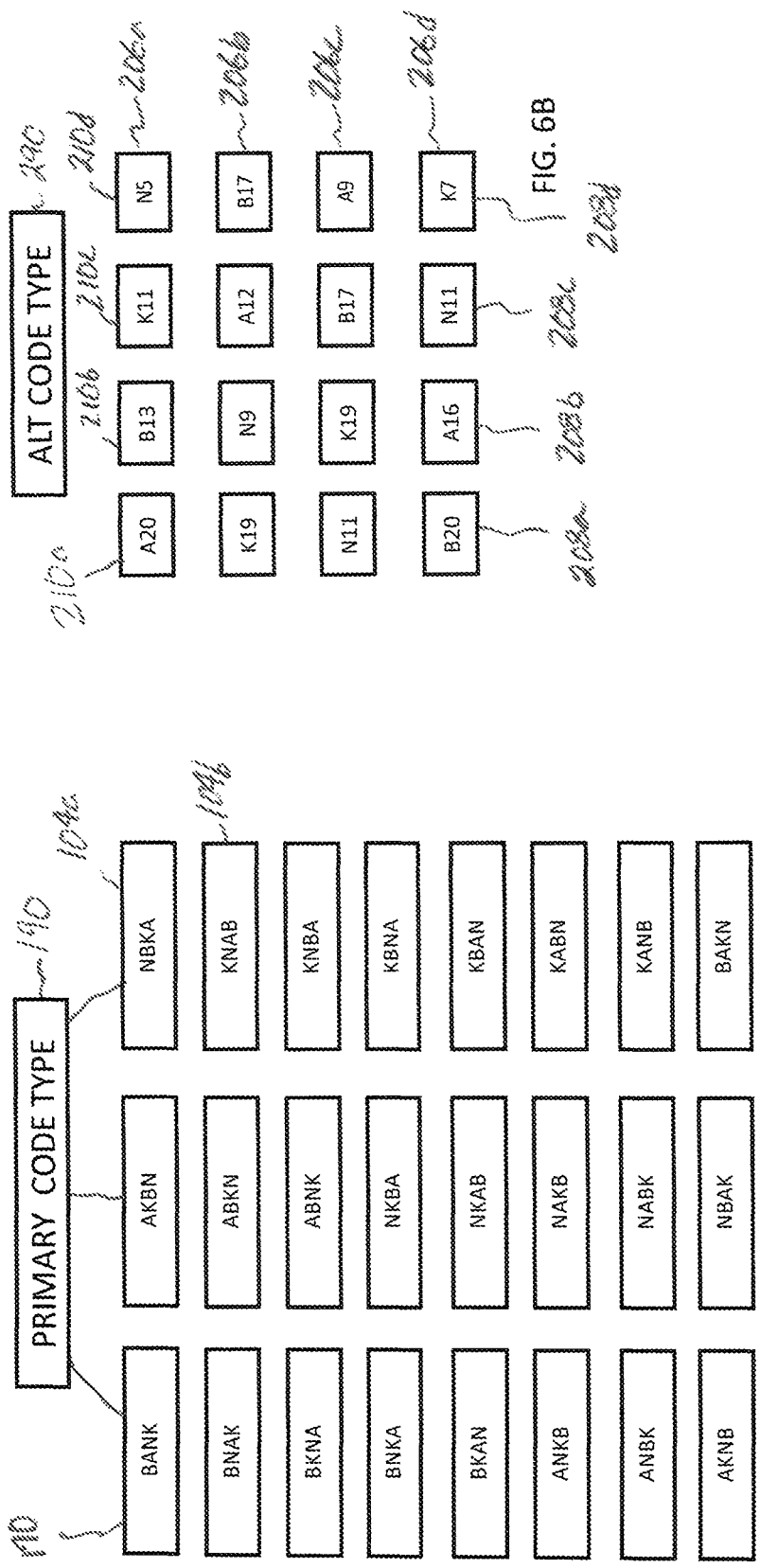

VALUE PREFERENCE CAPTURE FUNNEL AND CODING SYSTEM

BACKGROUND

1. Field of the Disclosure

The disclosure relates generally to the field of data capture and subsequent processing and, more particularly, to systems and methods aimed at providing tools for enriching the digital user experience and making programming resources more efficient.

2. Background of the Disclosure

In order to access restricted digital content, content providers typically employ a login page requiring the content requestor to set up an account if a new subscriber or enter the required login information if an existing subscriber. Either subscriber type is typically required to enter the login information in a set of fields, commonly a username or email address and a password, in order to gain access to the restricted content. Together, these fields represent two primary criteria of the login identification (ID) or login credentials of the content requestor.

As part of this content access process, the content provider may have security concerns that the requestor is either: a) a bot (software program) or b) another person impersonating the requestor. While the two prong criteria of username and password aim to alleviate this concern since the requestor normally has some control over both pieces of information, additional methods such as two-factor authentication are often used to verify the requestor's authenticity. In such case, a code is emailed to the email address of the requestor or texted to a predesignated phone number. The code may have an expiration component as well. If the requestor is authentic (assuming access to their own email or phone), then the code may be entered in a timely manner on the login page and access to the requested content granted.

Another alternative to authenticate the user/requestor used by many content providers is to employ a Completely Automated Public Turing test to tell Computers and Humans Apart (CAPTCHA) process wherein the requestor is required, for example, to type in an alphanumeric sequence or message, answer a math question, simply check a box, or select certain images associated with a keyword. This procedure is in addition to inputting the username and password. If the requestor enters the correct login ID and responds to the CAPTCHA correctly, an approval notification is generated and passed along with the login to the content provider module handling requestor access. If the requestor answers incorrectly, then access is denied until a new CAPTCHA is answered correctly along with the correct login ID or access may be revoked entirely or for a period of time.

Another solution for authenticating a user may be found in U.S. Pat. No. 10,587,423 to Nagaratnam et al. In this Nagaratnam patent, an improvement to conventional multifactor authentication systems that simply rely on username, password, and answers to basic security questions by employing cognitive psychology authentication is disclosed. According to this patent, a request is received to access a secure resource associated with a user. A set of cognitive psychology questions are selected from a plurality of cognitive psychology questions for transmission to a client device associated with the request. A set of responses corresponding to the set of cognitive psychology questions are received and cognitive psychology data is generated based on the set of responses. A cognitive psychology profile associated with the user is retrieved from a database. An authentication score is calculated based on comparing the cognitive psychology data to the cognitive psychology profile. An authentication success notification is transmitted when the authentication score compares favorably to an authentication threshold. An authentication failure notification is transmitted when the authentication score compares unfavorably to the authentication threshold. This approach generally determines the authenticity of the person entering the login ID by establishing a baseline or truth table through a questionnaire presented during the account creation process and then compares the results from subsequent inquiries to the truth table.

Another approach may be found in Indian Patent Application Publication No. IN201941008856A to Shivakumar, although this publication focuses more on a secure email system using a dynamic, human-profile based authentication system. More specifically, the user initiates the login process using a secure email platform and, if this is the first time login, the authentication module poses various psychological tests to assess the user's personality traits. The psychological tests, include a combination of personality tests like inkblot tests and Thematic Apperception test. The authentication module combines the test score along with the user profile attributes to create a personal psychological factor. The personal psychological factor and the scores for individual personality traits are stored in the user psychological profile store. Then, for subsequent logins, when the user tries to login, the authentication module invokes different types of tests to assess the personal trait. These tests may be also derived from the user's profile attributes. The user's responses are captured to arrive at the overall score. The authentication module compares the overall score as well as the score of individual personal traits. If the score is acceptable enough, the user is allowed to login. According to the publication, the uniqueness of the user is established by their personal traits in combination to user profile attributes. On the other hand, if the user's response score is less than acceptable, the system blocks the IP address of the user attempting login and exits.

While many solutions focus on authenticating the user, other content providers attempt to mine data from other sites using a common login to social sites or permissions to mine data in order to target content. For example, one such effort may be found in U.S. Patent Application Publication No. 2021/0233121 to Nomula. In this publication, the method disclosed includes enabling a user to sign into a website. An identifier is generated for the user if the user is signing into the website for the first time. Information corresponding to the user is mined and the information is linked to the user. Further, verification is made to determine whether the generated identifier matches with existing identifiers. If the generated identifier matches with an existing identifier, then existing information corresponding to the matched identifier is linked to the user. Targeted content may be presented to the user by processing at least the information linked to the user.

Another targeting approach may be found in U.S. Patent Application Publication No. 2011/0276408 to Toole. In general terms, this publication describes an ad delivery system that delivers personality profile typed ads to a user's Internet enabled devices (IED) when the device has a personality type marker-cookie (Ph-M data) thereon. Ad databases store ads designated by Ph-M type. The Ph-M data is loaded onto the IED when the user takes a test, the system classifies user's personality, and uploads Ph-M data onto the BID. Thereafter, when the user employs the IED, web servers recognize the associated Ph-M cookie-marker and the operative website server presents a personality typed ad to the user. According to the publication, the system delivers effective and relevant ads based upon the user's personality type.

Another approach focuses on collecting value related data from users visiting a specific website focused on collecting value data and may be found at my.bankcode.com, a website provided by Codebreaker Technologies, LLC wherein a visitor to the site may perform an exercise requiring them to sort a set of four value cards in an order of preference. The site owner or visitor may use the preference results to engage in subsequent communications and improve the likelihood of reaching common goals. This value based collection of information is also useful to a third party with access to the results. For example, if a third party knows the preferences of a visitor to their site, then a series of interactions between the two parties is likely to be more relevant. While such a system is extremely useful in capturing value based preferences of visitors specifically seeking this website, this approach misses the opportunity to take advantage of the entry points presented by other third party content providers. Such approach also misses the opportunity to provide user preferences prior to or at the point of entry into the restricted site of a third party content provider or upon subsequent visits such that the third party may alter their content in accordance with the user preferences to improve the user experience on and behind the entry page.

While the foregoing approaches generally describe conventional authenticator systems or data mining and targeted content systems, there remains a need for a system and method for capturing value based data at a point of entry provided by a third party content provider and transforming the value based data into useful tool that may be used to support content customization at or subsequent to the point of entry thereby creating a relevant, enhanced user experience more in line with the requestor's value preferences and motivations.

SUMMARY

In accordance with at least one embodiment disclosed herein, a system for capturing and transforming value preference based data may incorporate a data storage device and at least one processor to assemble at least one value-centric exercise incorporating one or more selections from a universe of value based choice elements and determine if a pre-existing value code has been established and, if not, alter the access sequence to a requested digital content presentation by actuating a value-centric exercise to collect a set of value based preferences assigned by the content requestor and generate a value code representing the set of value based preferences to deliver to a digital content provider wherein the digital content provider may provide the content requestor with access to the digital content presentation either in an original format or in a modified format based on the value code.

In other embodiments, the captured value preference based data may be tokenized, encrypted, or added to a selected blockchain and a delivery mode and an access mode selected to transfer the value code to the digital content provider and/or provide access to the value code.

In at least one exemplary embodiment described herein, the value-centric exercise is an interactive user interface incorporating a set of selected main value categories each with a corresponding set of value sub-categories to be presented to a content requestor with instructions to rank their preferences.

In yet another exemplary embodiment, an instructional trigger is used to transfer the results of the value-centric exercise to a location designated by a content provider.

In yet another embodiment, the value-centric exercise may be inserted into an entry page of the digital content provider and presented for completion prior to, simultaneous with, or subsequent to gathering and authenticating the login credentials from the digital content requestor.

Methods of using the value preference capture funnel and coding system are also disclosed herein.

Various objects, features, aspects, and advantages of embodiments will become more apparent from the following detailed description of preferred embodiments of the invention, along with the accompanying drawings in which like numerals represent like components.

BRIEF DESCRIPTION OF THE DRAWINGS

The present value preference capture funnel and coding system and methods relating thereto are described herein with reference to the following drawings of preferred embodiments, which are intended to illustrate and not to limit the present disclosure.

FIG. 5C illustrates another exemplary user interface or value-centric exercise for use with the value preference capture funnel and coding system of FIG. 1.

FIG. 6A illustrates an exemplary value code set realm.

FIG. 6B illustrates several examples taken from an alternative value code set realm.

DETAILED DESCRIPTION OF THE PREFERRED EMBODIMENTS

Figure 1:
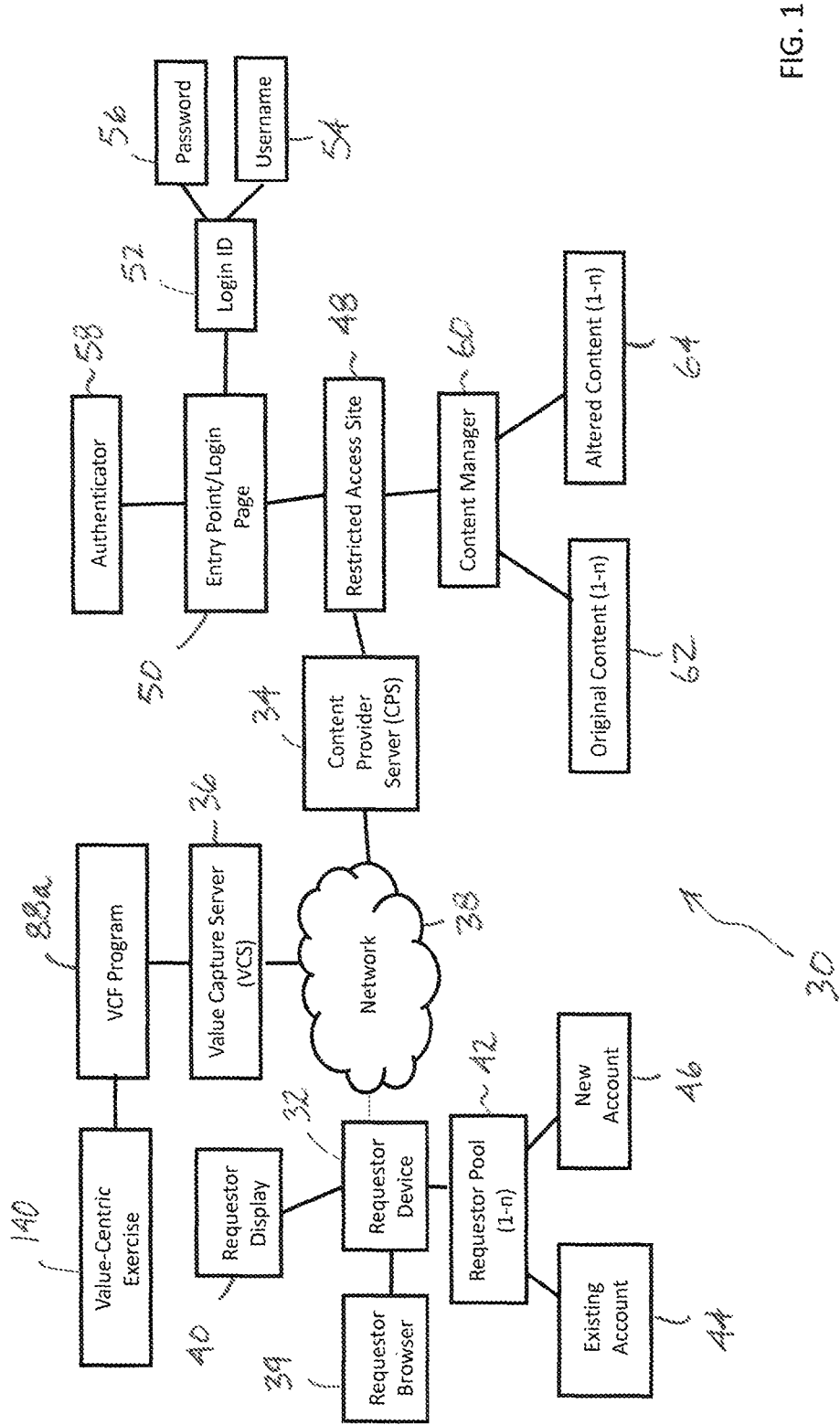
FIG. 1 is a block diagram illustrating an exemplary value preference capture funnel and coding system in accordance with at least one embodiment of the present disclosure.

Referring initially to FIG. 1, an exemplary value preference capture funnel and coding system, generally designated 30, is illustrated. Such system may be employed to capture value preference based data at the point of entry into a digital content site on a network by modifying, interrupting, coinciding with, or operating in parallel to a conventional login or entry sequence and presenting a value-centric exercise to retrieve a set of value based preferences from a content requestor. The captured value preference based data may be transformed into a tool offering, one or more useful insights into the content requestor's motivations for visiting and consuming the digital content on the site. Such capture and transformation of the exercise results may all take place during an initial login or entry sequence such that the content provider may tailor the requested digital content in accordance with the captured value preference based data on the initial visit or on a subsequent visit to the site by the requestor. Preferably, such modification of the conventional login or entry sequence is seamless or relatively seamless and adds minimal additional time allocation to the overall sequence granting access to the requested content while still resulting in a valuable programming and content presentation tool. It will be appreciated that value preference data capture only needs to be performed once by the requestor as the information may be stored for future reference but may also be performed repeatedly to update or restore the preferences if desired. It will further be appreciated that such value preference capture funnel and coding system 30 may be constructed to manage a large pool of content requestors on a significant scale as well as the myriad of interaction demands from the content providers and may be conducted in a secure environment.

With continued reference to FIG. 1, the value preference capture funnel and coding system 30 (also referred to herein as the VCF system) incorporates three main processing components or processing devices including a front end requestor device 32 or client and one or more back end servers which, in this exemplary embodiment, include a content provider server 34 (also referred to herein as the CPS) and a value preference capture funnel and coding server 36 (also referred to herein as the VCS), all communicating over a network 38 establishing a digital environment in which to operate. The requestor device 32 is a network ready device loaded with a browser 39 or other suitable network navigating tool and includes a display device 40 with input capabilities for interacting with the other servers 34, 36 over the network 38. The requester device 32 is accessible to one or more requesters from a large requester pool 42 or each requestor may have their own requester device. In this exemplary embodiment, a requester 42 generally uses the requester device 40 to seek access to one or more digital content presentations 62 created by a content manager 60 handling the digital presentation aspects of the content providing server (CPS) 34. The requestor pool 42 consisting of individual content seeking requesters is typically divided into those with existing accounts 44 wherein login credentials 52 and new subscribers 46 relative to the existing CPS account data. In the exemplary embodiments disclosed herein, the term content requester, requester, and requester pool will be used interchangeably unless otherwise noted.

Still in reference to FIG. 1, the content provider server (CPS) 34 provides a restricted access site or page 48 available on the network 38 with an entry point 50 such as a login page. The login page requites entry of login credentials such as a login ID 52, typically a username or email address 54 and a password 56 unique to the requester 42, to gain access to the restricted access site 48. Authentication of the login ID is typically managed by an authenticator 58 which may be managed by the content provider 34 or a third party as would be understood by one of ordinary skill in the art familiar with a conventional login process. The restricted access site 48 in turn is managed by a content manager 6Q that may include one or More programmers, digital artists, multi-media presentation managers, an artificial intelligence or software capable of producing content, or one or more individuals capable of producing, updating, modifying, and managing original digital content 62 typically in the form of one more digital presentations that includes one or more aspects of multi-media for production on the requester's display device 40 or other output device: As further discussed below, such original content 62 may also be altered, updated, tailored, or otherwise customized to produce value-centric altered content 64 in accordance with the value preference based data captured and processed by the value preference capture funnel and coding server 36 during an initial or subsequent login or landing page entry sequence.

Figure 2:
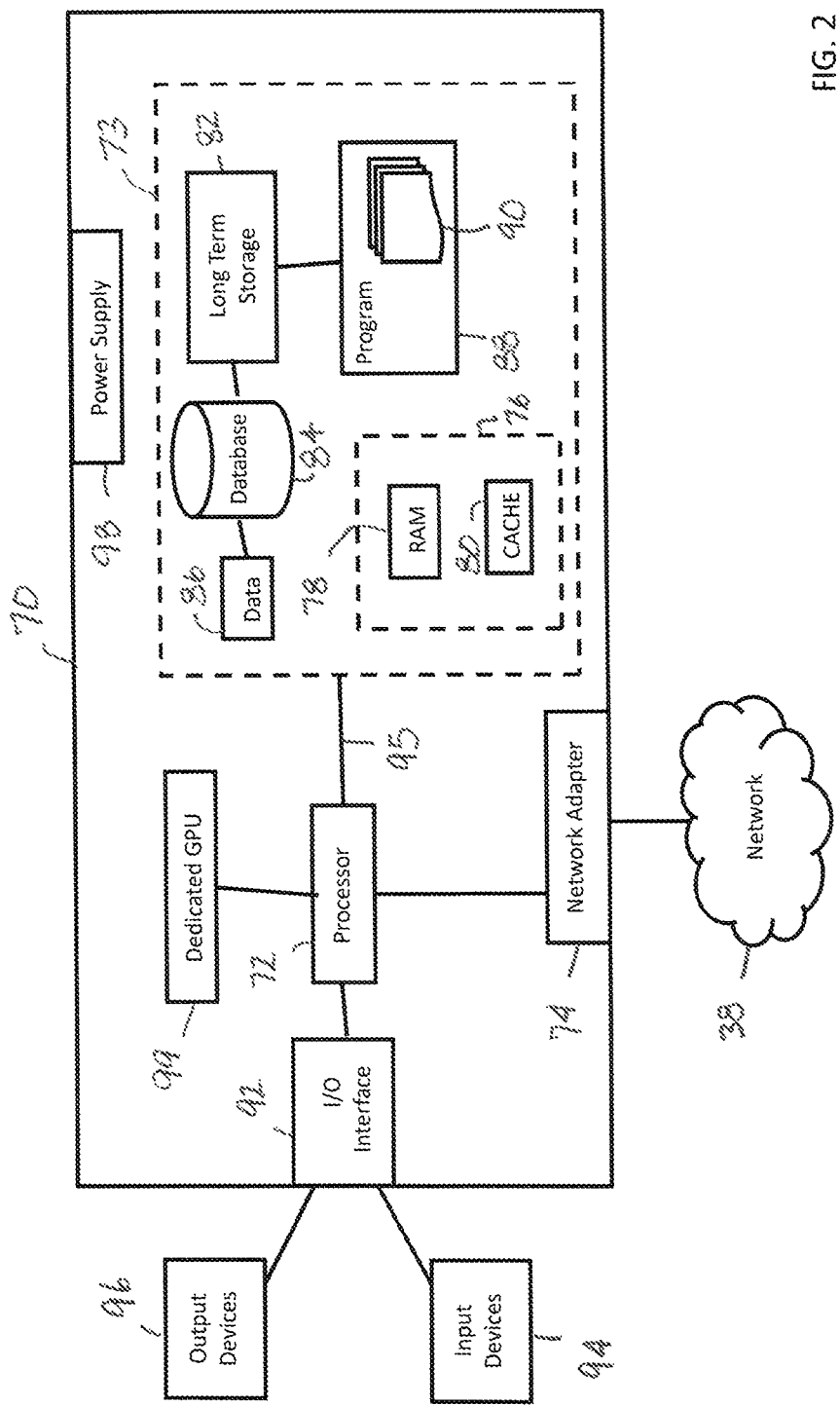
FIG. 2 is a block diagram illustrating an exemplary processing device or server that may be used with the value preference capture funnel and coding system of FIG. 1.

Referring now to FIG. 2, the processing components 32, 34, and 36 incorporate components cooperating to receive, store, transmit, and process data and present at least one user interface and other digital presentations 62, 64 (FIG. 1) to the requester device 32 within the VCF system 30. As shown in FIG. 2, the processing components will typically include a number of components for communicating with other devices over the network 38 and processing data inputs as well as storing and updating the data in support of the VCF 30 implementation. More specifically, the processing components 32, 34, and 36 may each include an optional housing 70 enclosing a motherboard or printed circuit board (not shown) with at least one processor or central processing unit (CPU) 72 in communication with a network adapter 74 or network interface device or card for communicating with the network 38 and other devices on the network. The network adapter 74 is preferably constructed to communicate through a wired, wireless, or a combination connection to the network 38 using well known protocols.

With continued reference to FIGS. 1-2, the processor 72 (Microprocessor, processing unit, or CPU) is also in communication with one or memory components 73 including a short term transient memory 76 which includes one or more random access memory (RAM) units 78 and a cache 80. In this exemplary embodiment, RAM is a computing device that stores data and programs currently used by the CPU while cache is a fast memory component that stores the frequently used data by the CPU. The processing unit 72 is also in communication with the memory components 73 in the form of one or more long term, non-transitory, storage devices 82 such as a hard disk drive (HDD), a solid state drive (SSI)), or other suitable persistent storage device in which resides a data storage device or database 84 storing one or more data sets 86 and at least one program 88 or web application with a set of program files 90 (FIGS. 2 and 8) or modules with instructions that may be executed by the processor 72. In the case of the VCS 34 in particular, the modules 90 are generally accessed by the processing unit 72 to generate value-centric or value based exercises, capture value preference based data as well analyze and transform or process the value preference based data into a new output that may be provided to the digital content provider server 34 and serve as a useful tool for the content manager. Such tool may be used to depart from or focus the original content 62 and produce more efficient, altered content 64 on the requestor's display device 40, initiate a sequence of events between the requestor and digital content provider server 34, and/or segment the requestor pool 42, among other uses as further discussed below.

With continued reference to FIG. 2, the processor 72 is also in communication with an input/output (I/O) interface 92 that is in turn in communication with a set of input devices 94 and a set of output devices 96. Non-limiting examples of suitable input devices includes smartphones, laptops, mobile devices, desktop computers, keyboards, mice, touchscreens, brain computer interfaces, tactile input devices, controllers, and/or voice responsive input devices. Non-limiting examples of suitable output devices includes smartphones, laptops, mobile devices, desktop computers, monitors, keyboards, brain computer interfaces, mice, controllers, tactile output devices, and speakers. It will be appreciated that some devices may be used as both an input device and an output device depending on their capabilities. A power supply 98 with a power cord that may be connected to an outlet or power source or a battery pack or combination thereof provide the power necessary to power on and maintain each device 32, 34, and 36 in an active state in use. Each of the components may communicate over a bus such as that exemplified and designated 95 in FIG. 2 or other suitable data and power line as would be understood by one of ordinary skill in the art familiar with computer architecture.

With ongoing reference to FIGS. 1-2, it will be appreciated that the requestor device 32, CPS 34, and VCS 36 may all have different sizes, inputs, outputs, speeds, capacities, components, and component arrangements as is suitable for the tasks each device or server is undertaking as described herein. For example, the requestor device 32 may incorporate a dedicated graphics processing unit (GPU) 99 for better display quality since the content will be displayed on the display device 40 at the requestor location. On the other hand, the CPS 34 and VCS 36 may have larger long term, memory 82 capacities and processing speeds to handle a large quantity of content and/or requestor data. In most instances, the requestor device 40 may be relatively simple with respect to the component requirements while the CPS 34 and the VCS 36 will have more complex component requirements to handle a greater complexity and scale managing a large requestor pool 42. It will also be appreciated that the functions described herein may be performed on a single device, multiple independent devices, or multiple devices in communication with each other over the network 38, whether the internet or a local network.

Figure 3:
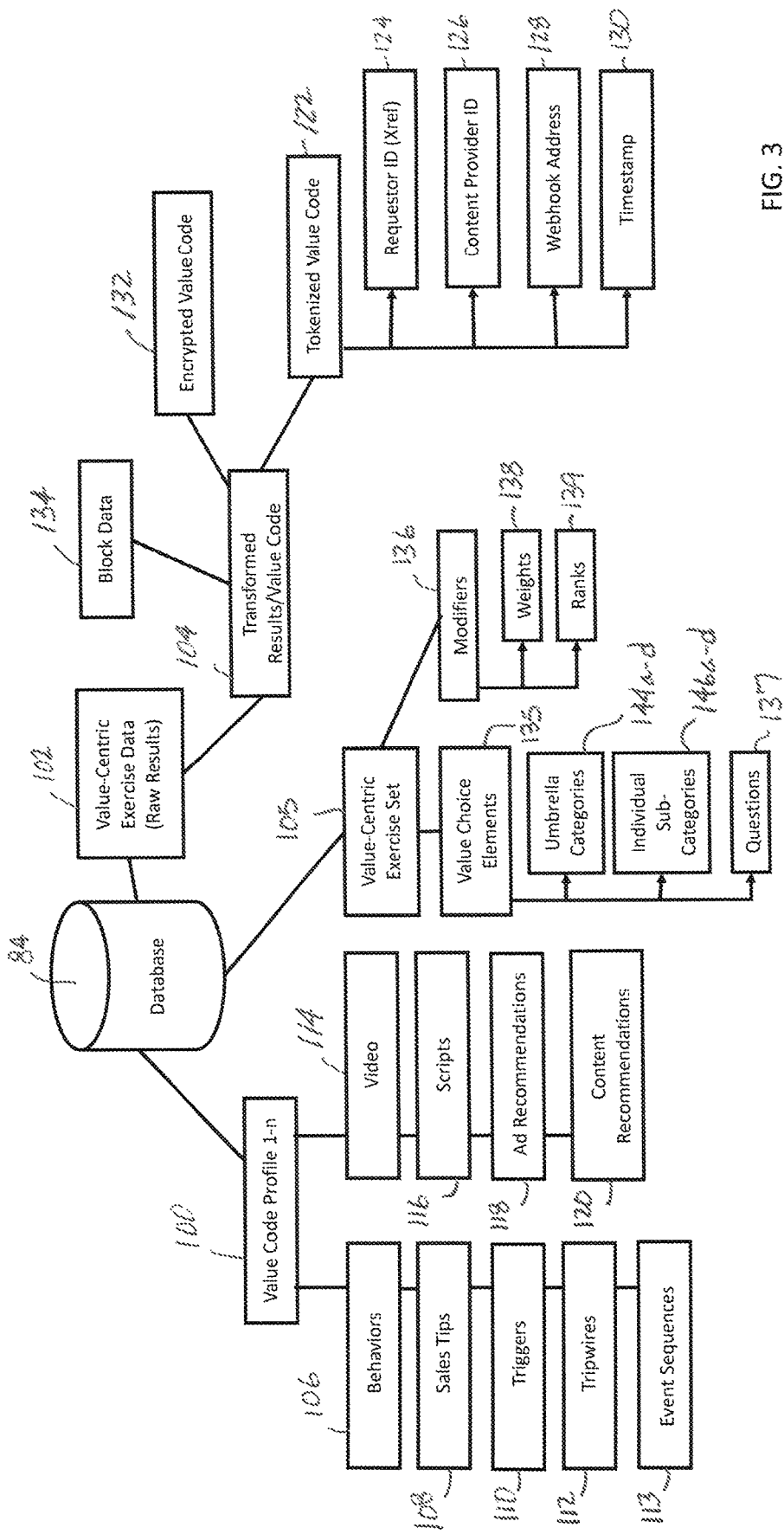
FIG. 3 is a block diagram illustrating an exemplary database construction for use with the value preference capture funnel and coding system of FIG. 1.

Referring now to FIGS. 1-3, the data set 86 (FIG. 2) stored, maintained, and updated or modified in the database 84 or data storage device may generally be segregated into a number of data subsets including a plurality (1-n) of value code profiles 100 (FIG. 3), a plurality (1-n) of value-centric exercise results 102 or raw data obtained from the requestor 42 (FIG. 1) performing the value-centric exercise 140 (FIGS. 1 and 5A), a plurality (1-n) of transformed results 104, and a value-centric exercise set 105 to be used in generating the value-centric exercises 140. The value code profiles 100 generally include one or more content altering tip categories that together define a requestor interaction and presentation guide that may be used by the content manager 60 to tailor or otherwise customize original content 62 into altered content 64 for more efficient interactions with the requestor 42 based on the requestor's value preferences captured during the login sequence as described below. In this exemplary embodiment using a buyer-seller scenario for example, the content altering tip categories making up the value code profile or guide 100 may be divided into a buyer behavior set 106, one or more sales tips 108 for engaging with a buyer, one or more sales triggers 110 or events that occur during the interaction between the buyer and seller to further the transaction, one or more sales tripwires 112 which are events to avoid during the buyer-seller interaction, one or more event sequences 113 that may be used to direct a transaction or series of events upon a triggering event, one or more sales oriented videos 114, one or more sales scripts 116, one or more advertising recommendations 118, and one or more content recommendations 120.

As part of the VCF system 30 implementation, the plurality (1-n) of value-centric exercise raw results 102 are further processed into the plurality (1-n) of transformed results 104 using a code generation algorithm. The value-centric exercise results 102 include the value preference based choices made by the requestor 42 following completion of the value-centric exercise 140 described below. These value-centric exercise results 102 are generally referred to as the raw data or raw captured value data and are highly relevant to the motivations, principles, and values causing the requester 42 to seek out, consume, and interact with the digital content presentations 62 on the content provider's site 48 or other third party content. As part of the implementation of the value preference capture funnel and coding system 30, the raw results 102 may be transformed into a value code 104 which is representative or indicative of the value-centric exercise results 102.

The transformed results 104 may further be processed and stored in the database 84 to support different delivery modes including a tokenized value code 122 that may include a unique requester ID 124 (also referred to as the Xref and often the same, similar to, or based on the username 54 of the requester 42), a content provider ID 126, a webhook address 128 if used, and a timestamp 130 which may be used to establish a duration for which the tokenized value code 122 remains available after transmission. The webhook address 126 is the location that the webhook result will be forwarded to after the triggering event occurs as explained further below. Other delivery modes include an encrypted value code 132 and a set of block data 134 for adding to a blockchain. Each of the delivery mode specific data incorporates the transformed value code 104 in some form generally dependent on the business practices and requirements (the business rules 180) established by the content provider server 34 or its administrator. Any one of these delivery mode variations may be passed to the CPS 34 to provide access to the actual value code 104 depending on the business rules ISO (FIG. 7B) provided by the content provider server 34.

The value-centric exercise set 105, from which are drawn the elements to assemble the value-centric exercise 140, includes at least a set of value based choice elements 135 and may include and a set of modifiers 136 as well. The value based choice elements 135 may be further broken down into a set of main umbrella categories 144a-d, a set of related individual value sub-categories 146a-d, and a set of questions 137. The modifiers may include a set of numerical weights 138 and a set of numerical ranks 139 that may be assigned to the value based choice elements 135 by the requestor 32 or by the program 88a in the VCS 36 and may be incorporated into the algorithm for processing the raw results 102 into the value code 104. These value based choice elements 144a-d, 146a-d, and 137 and modifiers 138, 139 may be accessed from the database 84 to selectively use in rendering and presenting the value-centric exercise 140 (FIGS. 1 and 4).

Figure 4:
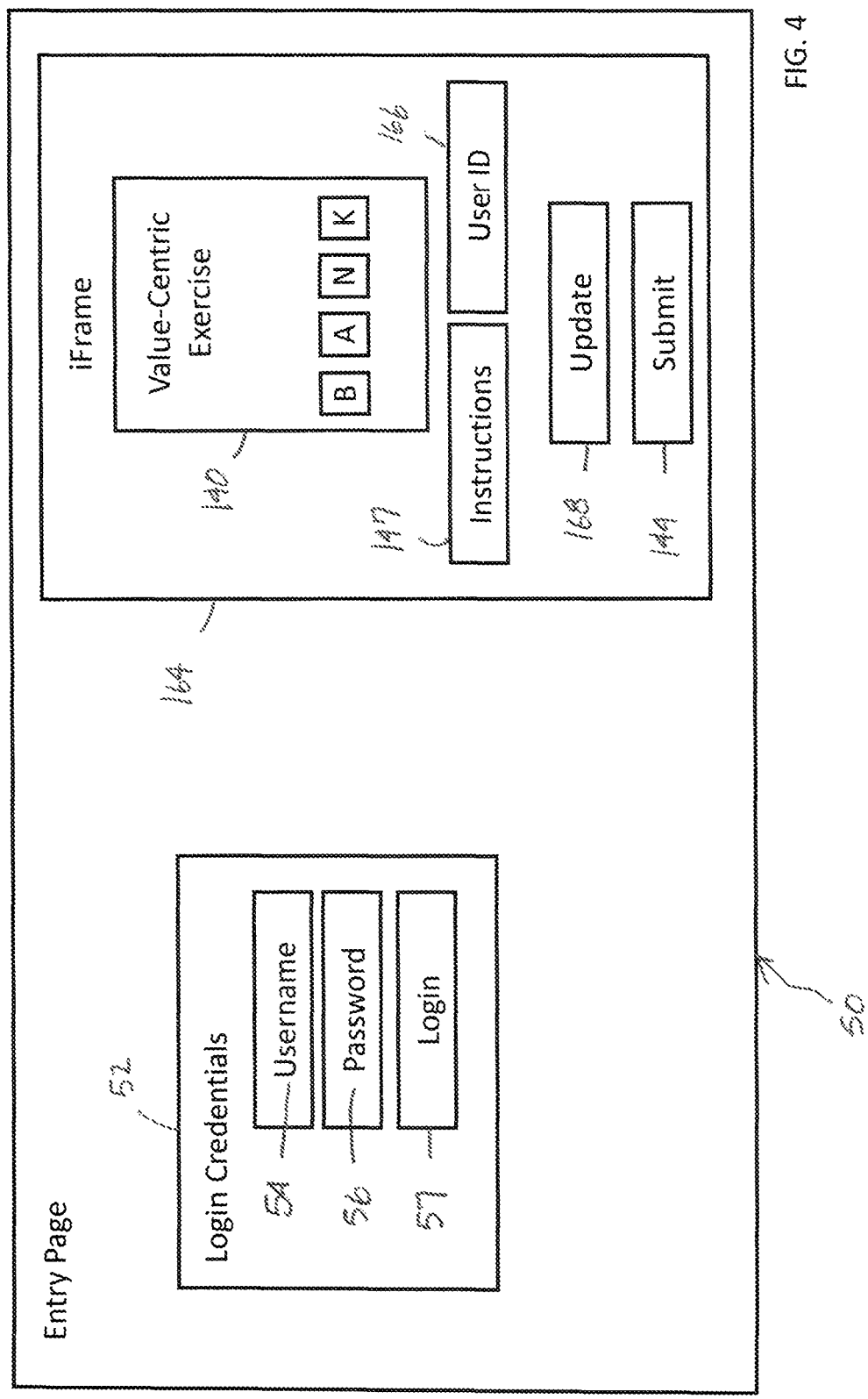
FIG. 4 illustrates an exemplary entry or login page for use with the value preference capture funnel and coding system of FIG. 1.

Turning now to FIG. 4, an exemplary entry page 50 is illustrated. In this exemplary embodiment, the entry page is understood to be a login page to a restricted content site 48. However, it will be appreciated that any landing page presented by the CPS 34 in response to a request for a digital content presentation 62 by the requestor 42 may define an entry page, even if unrestricted. The entry page 50 includes a login credentials section 52 with text entry boxes for a username (or unique requestor ID) 54 and a password 56 on the left hand side of the page set above a login submission button 57. On the right hand side of the page is an iFrame region 164 which includes the value-centric exercise 140, an instruction set or link 147 and a submit button 149. Optionally, the iFrame region 164 may include a text entry box 166 for a user ID in case the unique requestor ID 54 is not passed to the VCS 36 directly from the CPS 34. Another option is to provide an update button 168 that a requestor 42 may select in order to update their pre-existing value code 104.

Figure 5A:
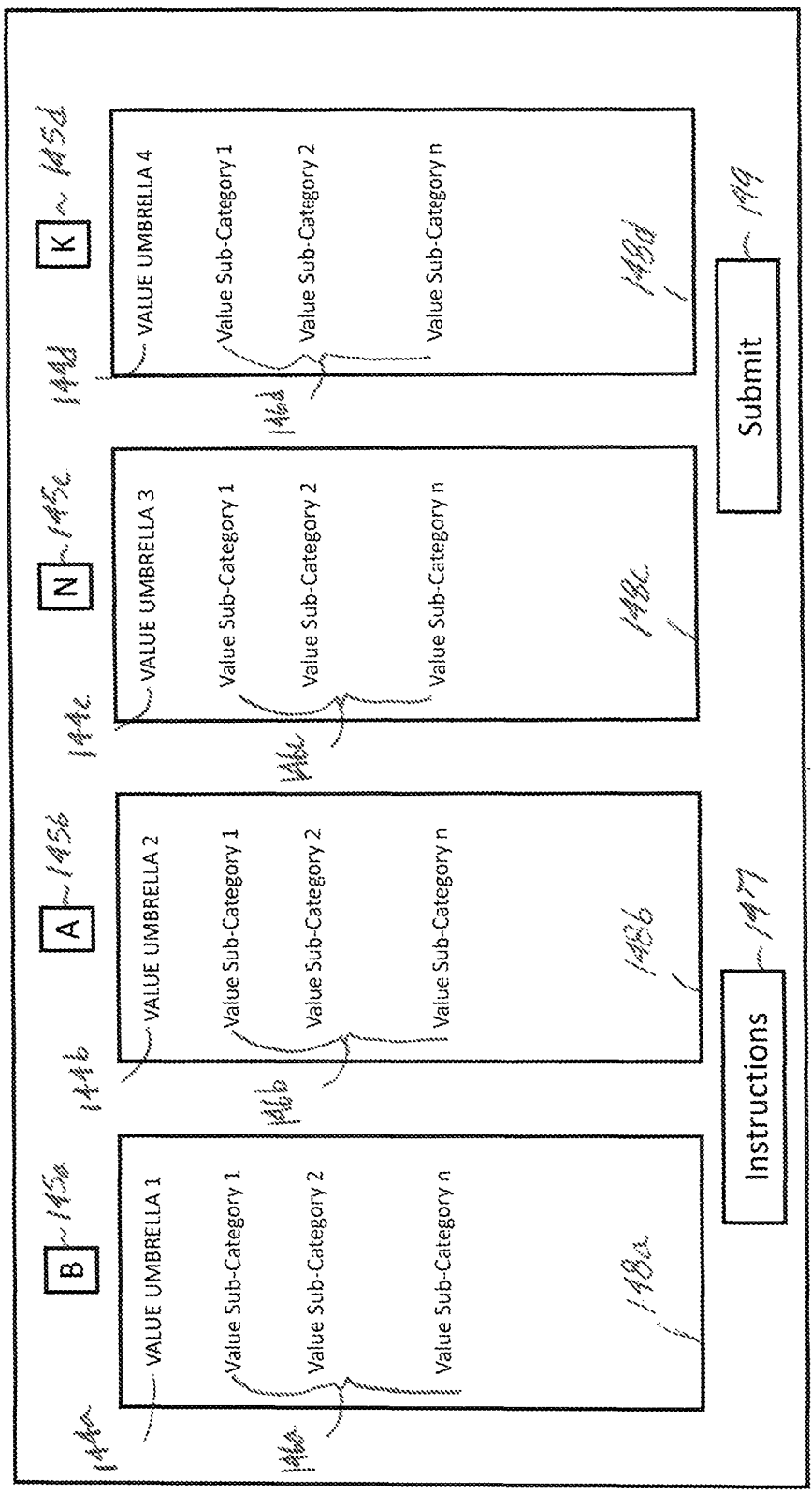
FIG. 5A illustrates an exemplary user interface or value-centric exercise for use with the value preference capture funnel and coding system of FIG. 1.

Referring now to FIG. 5A, an illustration of an exemplary value-centric exercise, generally designated 140, will now be discussed. In this exemplary embodiment, the value-centric exercise is presented as an interactive display 142 which, in this example is a card sorting area displayed or rendered on the requestor's display device 40. The card sorting, area defines four unique value sets used to determine the value preferences of the requestor 42. More specifically, the value-centric exercise 140 in this exemplary embodiment includes a plurality of umbrella (primary or main) categories or headings 144a-d with each category including an associated set of individual value-centric sub-categories or sub-headings 146a-d that generally fall within or relate to the realm or one or more traits defined by the respective umbrella category. In other words, the sub-category value listings each have a common trait falling under the associated umbrella category. Each of the umbrella value categories 144a-d and value sub-categories 146a-d have readily recognizable dictionary definitions or may be defined by the VCS 36 and provided to the requester 42 prior to taking the value-centric exercise 140. Alternatively, the value definitions may be provided after the value-centric exercise is performed to gauge any gaps between the requester's understanding of the value definition and that intended by the VCS program 88a. Together, the umbrella and sub-categories may be used to define a complete universe of value sets 105 (FIG. 3) for purposes of the value-centric exercise 140. In this example, there are four individual value subsets with each individual value subset disposed within a respective card icon or image 148a-d. Above each card 148a-d is a symbol 145a-d associated with or otherwise representing that particular card. In some embodiments, the symbol may be a shortened version of the respective umbrella category, the same as the umbrella category, or in lieu of the umbrella category. The cards 148a-d may be sorted or moved about within the interactive display 142 to ultimately reside ill a preferred order established by the requester 42 to complete the value-centric exercise 140.

More specifically and with continued reference to FIG. 5A, the value sets 144a-d. 146a-d in this exemplary embodiment are associated with a set of four symbols including a symbol for Blueprint (B) 145a, Action (A) 145b, Nurturing (N) 145c, and Knowledge (K) 145d. Moreover, the B symbol 145a value set 144a, 146a includes twelve associated value sub-categories 146a including Stability, Structure, Systems, Planning, Processes, Predictability, Responsibility, Duty, Rules, Credentials, Titles, and Tradition. These associated values are what a user placing a priority on the B category are aligned with and responsive to.

The A symbol 145b value set 144b, 146b also includes twelve associated value sub-categories 146b including Freedom, Flexibility, Spontaneity, Action, Opportunity, Excitement, Attention, Stimulation, Competition, Winning, Fun, and Image. These associated values are what a user placing a priority on the A category are aligned with and responsive to.

The N symbol 145c value set 144c, 146c includes twelve associated value sub-categories 146c as well including Relationships, Authenticity, Personal Growth, Significance, Teamwork, Involvement, Community, Charity, Ethics, Harmony, Morality, and Contribution. These associated values are what a user placing a priority on the N category are aligned with and responsive to.

The K symbol 145d value set 144d. 146d, as with the other value sets, also includes twelve associated value sub-categories 146d including Learning, Intelligence, Logic, Self-Mastery, Technology, Research and Development, Science, Universal Truths, Expertise, Competence, Accuracy, and The Big Picture.

An instruction link 147 or description is provided beneath the card sorting area 142 and a submit button 149 is provided to the right of the instruction link as well to enable the requestor to transmit the raw results 102 (FIG. 3) of the value-centric exercise 140 to the value preference capture funnel and coding (VCS) server 36 for further processing.

Figure 5B:
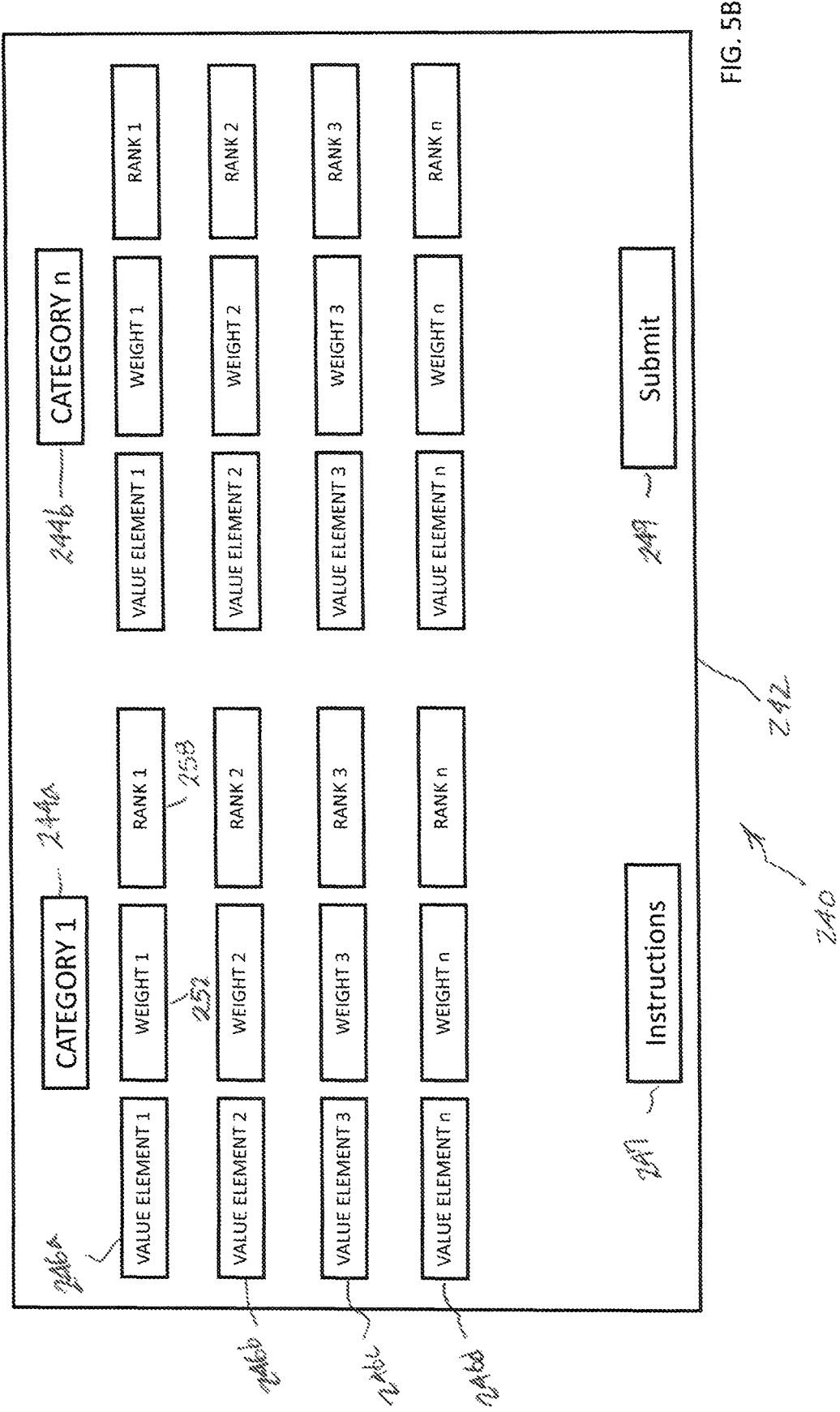
FIG. 5B illustrates another exemplary user interface or value-centric exercise for use with the value preference capture funnel and coding system of FIG. 1.

While the foregoing value-centric exercise 140 represents a preferred presentation given its relative simplicity; it will be appreciated that the value-centric exercise may take a variety of suitable forms to gather the preferred order and importance of a value set from the requestor 42. Turning now to FIG. 5B, a first alternative value-centric exercise or page, generally designated 240, is presented. In this interactive value-centric exercise 240, an interactive display 242 presents a plurality of umbrella categories 1-n 244a, 244h at the top of the page. Under each umbrella category is a set of value elements 1-n associated with each category 1-n. For example, under umbrella category 244a, there are four value element rows 246a-d with each row including an associated weight modifier box as, for example, the weight modifier box designated 252. This allows the requestor undertaking the exercise to select or enter a weight next to each associated value element. As a complement or in lieu of the weight modifier, a ranking modifier box as, for example, the ranking modifier box designated 258 may be displayed as well. The ranking modifier boxes allowed the requestor undertaking the value-centric exercise to select or enter a rank next to each associated value element 1-n under each category 1-n. While text entry is one method for entering either a weight modifier, a rank modifier, or both associated with a particular value element 246a-d, it will be appreciated that the rows 246a-d may be moved about the interactive page 242 in a preferred order as an alternative. At the bottom of the page is an instruction link 247 that leads to a set of instructions for completing the questionnaire and a submit button 249 for selecting when the exercise 240 is complete.

Figure 5C:
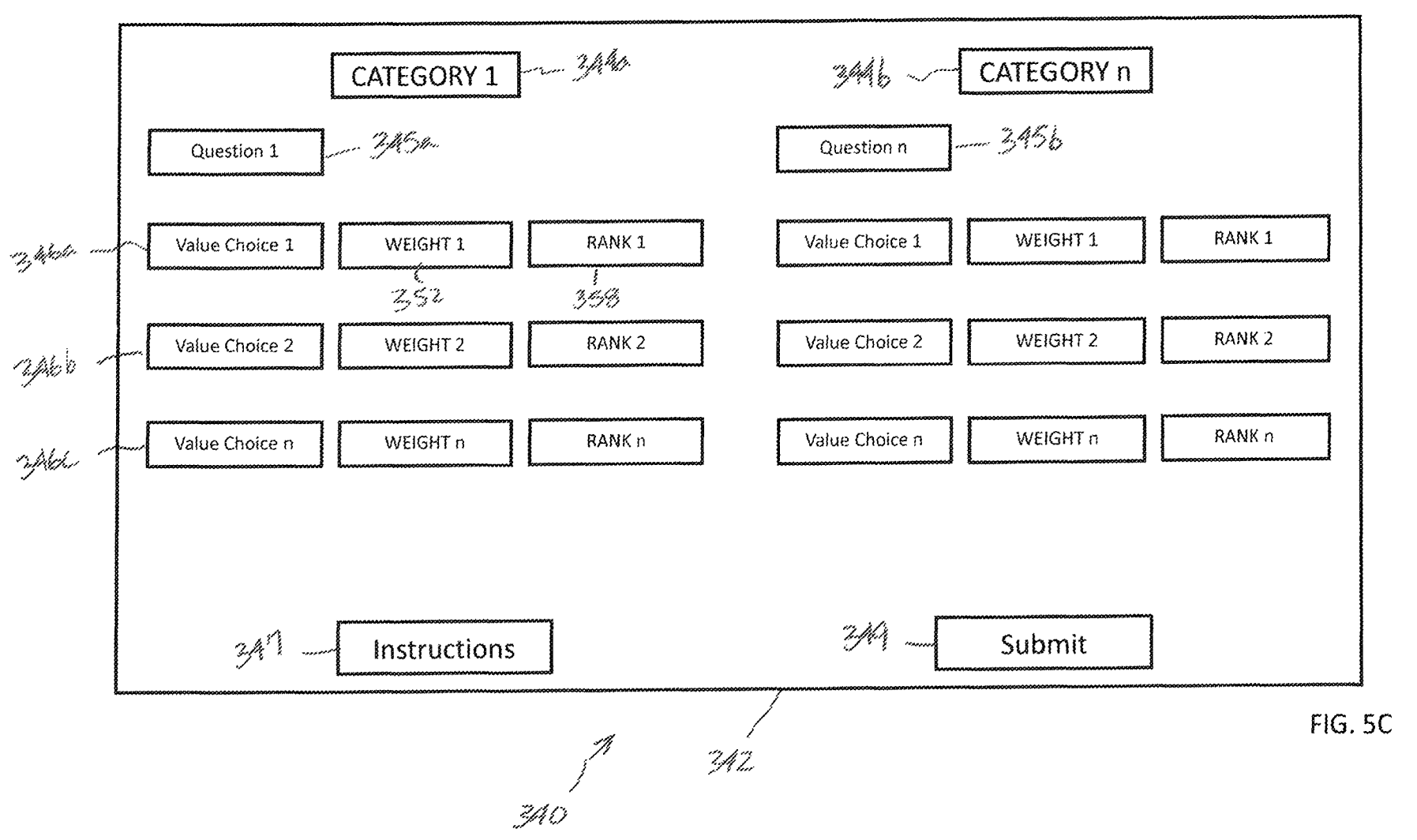

Referring now to FIG. 5C, another exemplary value-centric exercise, generally designated 340, is presented in the form of value choice questionnaire. On this interactive value-centric page 340, similar to the previous value-centric exercise 240 are a number of categories 1-n 344a, 344b at the top of the page. Beneath each category is a value based question 1-n 345a, 345b corresponding to the category above 344a, 344h. Beneath each question is a number of value choices 346a-c responsive to the question. To add further complexity and insight into the requestor's motivations, each value choice may be associated with a weight modifier entry box as, for example, weight modifier entry box 352 associated with value choice 1 346a and may also be associated with a ranking modifier entry box as, for example, ranking modifier entry box 358. The weight modifier entry and ranking modifier entry boxes may be added to enable the requestor 42 to assign a weight, a rank, or both to each value choice 346a-c. As with the prior value-centric exercise 240, the value choices may also be moved about the interactive display page 342 in a preferred order by the requestor 42 as an alternative to entering the weight and/or rankings. At the bottom of the page is an instruction link 347 that leads to a set of instructions for completing the questionnaire and a submit button 349 for selecting when the exercise 340 is complete.

While the primary examples of value-centric exercises 140, 240, 340 discussed herein include an interactive card sorting format, a weighting and ranking format, and a questionnaire format, it will be appreciated that other value-centric exercises may be generated. As non-limiting examples, value word associations and pictorial representations of values may all be stored within the database 84 for access by the presentation module 90a for generating a value-based exercise that, in general, requires the requestor 42 to make choices about value preferences, including categorical and/or individual value preferences, orders of importance, and other modified selections prior to being granted access to the original content 62 on the restricted site 48 allowing the content manager 60 to better understand the motivations, principles, and values of the requestor prior to providing, the content on an initial or subsequent visit.

Referring now to FIGS. 6A-6B, the transformed value code 104 may take several forms. As shown in FIG. 6A, a preferred value code type 190 constructed from a realm of value codes 104a, 104b, and the remaining codes from the set of twenty-four individual codes are depicted as a letter based code with a variety of combinations as for example letter code 170. In this example, based on a four letter combination, twenty-four codes are available with each letter in the code representing an umbrella category 145a-d (FIG. 5A) chosen in a preferred order from the value-centric exercise 140. Of course, the addition or more letters, numbers, or other symbols would increase the universe of available codes. To transform the raw results 102 into one these type of codes, the identifiers 145a-d representing each umbrella category 144a-d are disposed in the order of preference established by the requestor 42 submitting the raw results of the value-centric exercise 140. For example, letter code 170 of BANK indicates that the requestor places the most importance on Blueprint type values and the least importance on Knowledge type values.

Referring now to FIG. 6B, alternate code type 290 provides additional insight into the requestor's 42 value preference choices and would more likely result from the value-centric exercises shown in FIGS. 5B-5C, in this exemplary embodiment, four distinct code rows 206a-d are shown. Each code row consists of four columns 208a-d with each column including a letter and a number indicator. In this exemplary embodiment, the letter represents the umbrella value category 145a-d (FIG. 5A) and is placed in the row in accordance with their preferred order selection during the value-centric exercise. The number next to each letter further represents a weight or ranking modifier associated with each umbrella category as assigned by the requestor 42. Alternatively, each value element 1-n 246a-d, each value choice 1-n 346a-c, and/or each question 1-n 345a-b may carry a maximum fixed number weight such as five points for example. Thus, for each response, a weight of one to five points may be assigned to the value element, value choice, and/or question presented in the value-centric exercise 140, 240, or 340. The number of value elements (or value choices, value based choices, or value based choice elements) and/or questions as well as umbrella categories sets the maximum score. For example, taking the value-centric exercise 340 in FIG. 5C for example, with five categories 344a-n each having four questions 345a-n each, the maximum score would be one hundred points if the requestor were instructed to assign from one to five points to each question 345a-n. In other words, each category would have a maximum of twenty points and a minimum score of four.

Such code type 290 (FIG. 6B) provides additional depth and insight about the requestor's value choices and where the requestor stands in each category 1-n 344a-b that may be compared to an established benchmark, such as the high score or other meaningful benchmark. Taking the first row code 206a for example, assuming a score of twenty is the ceiling, the user of the code will understand that the requestor prefers the Action category 210a overall and has maximized the associated values. On the other hand, the requestor is well down the scale in the Nurturing category 210d and may need additional guidance to improve their score in that area. The content manager 60 may also interpret the code to focus their digital content presentation 62 to focus heavily on action based values given the greatest weight in that category. Such code type may also be used to present guidance for advancing a requestor on an upward path to improve where deficient, focusing digital content presentations more heavily on what matters most to the requestor, segmenting the requestor pool 42 based on common code scores, or even recruiting purposes.

Figure 7A:
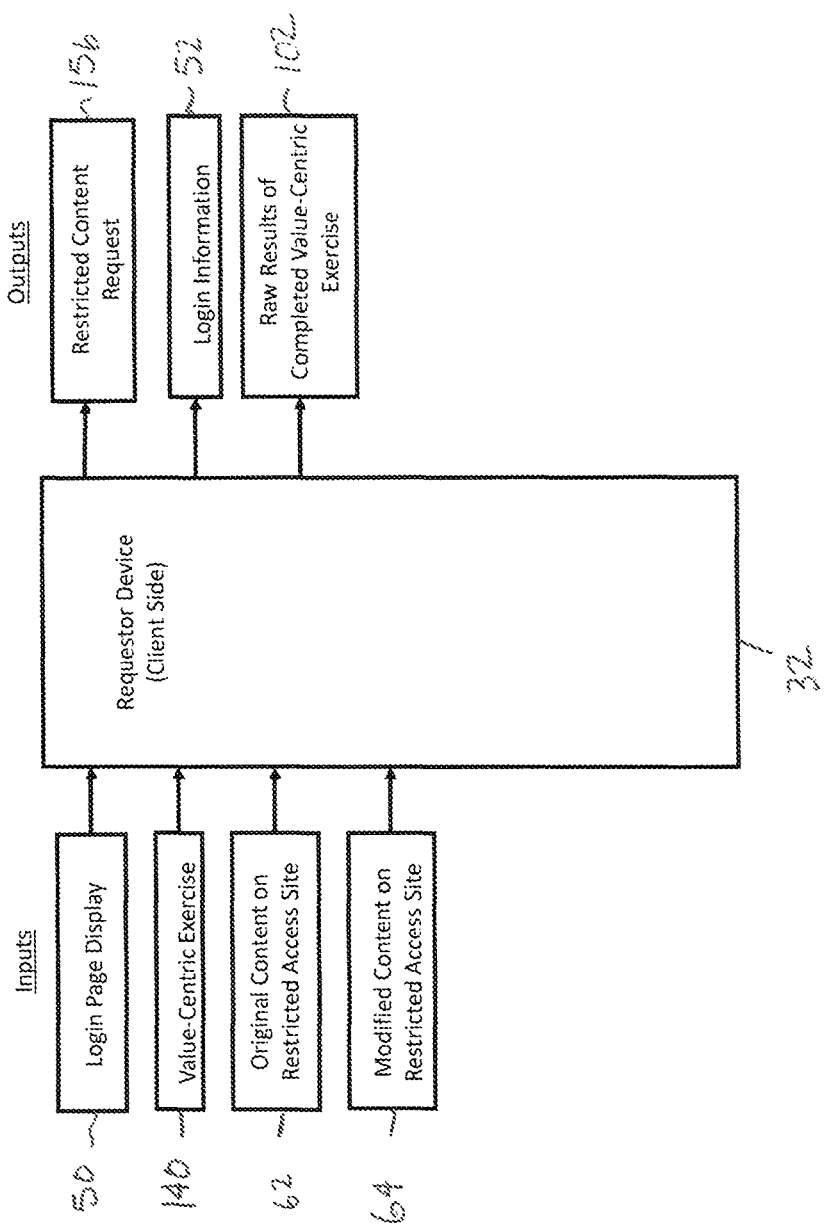
FIG. 7A is a block I/O diagram of an exemplary requester device that may be employed in the value preference capture funnel and coding system of FIG. 1.
Figure 7B:
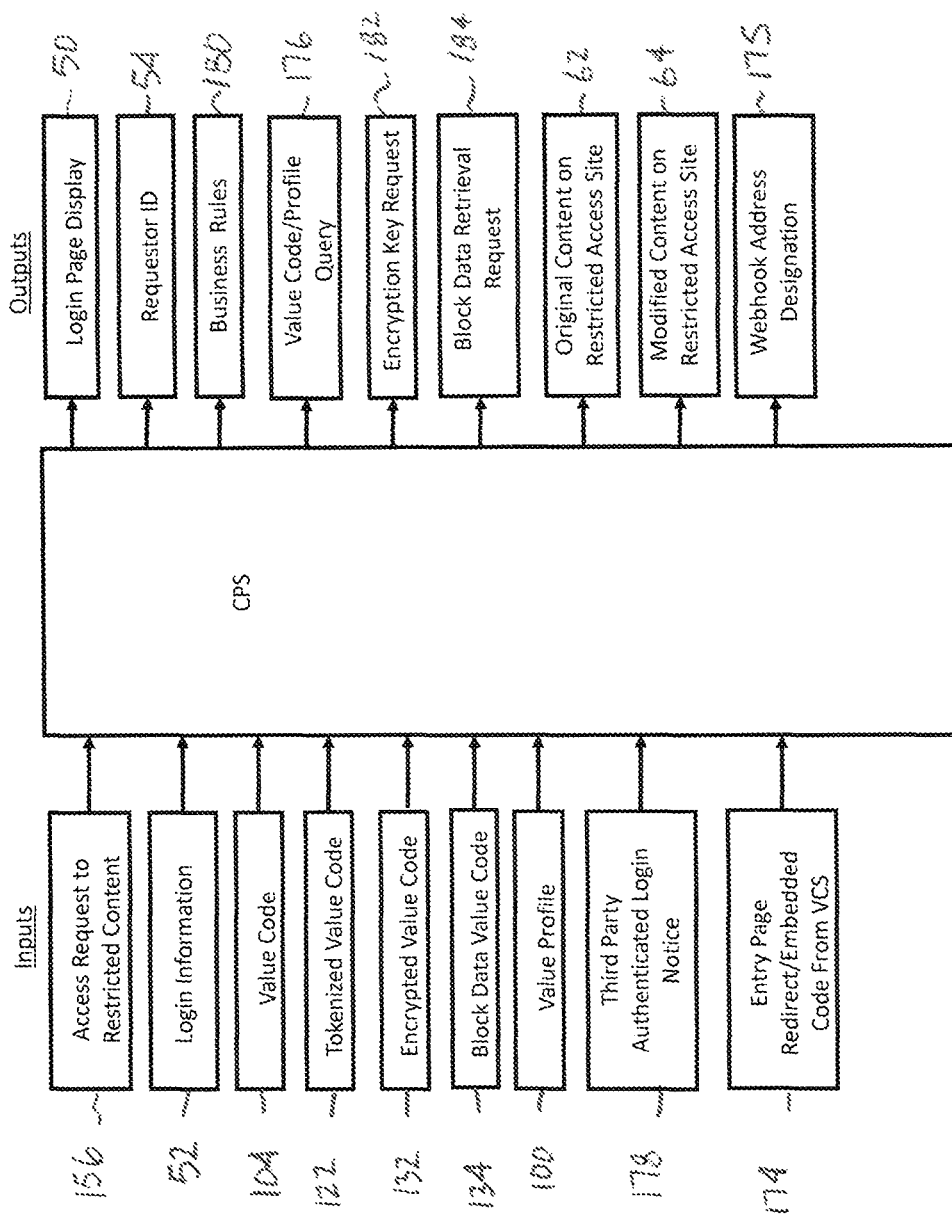
FIG. 7B is a block I/O diagram of an exemplary content provider device that may be employed m the value preference capture funnel and coding system of FIG. 1.
Figure 7C:
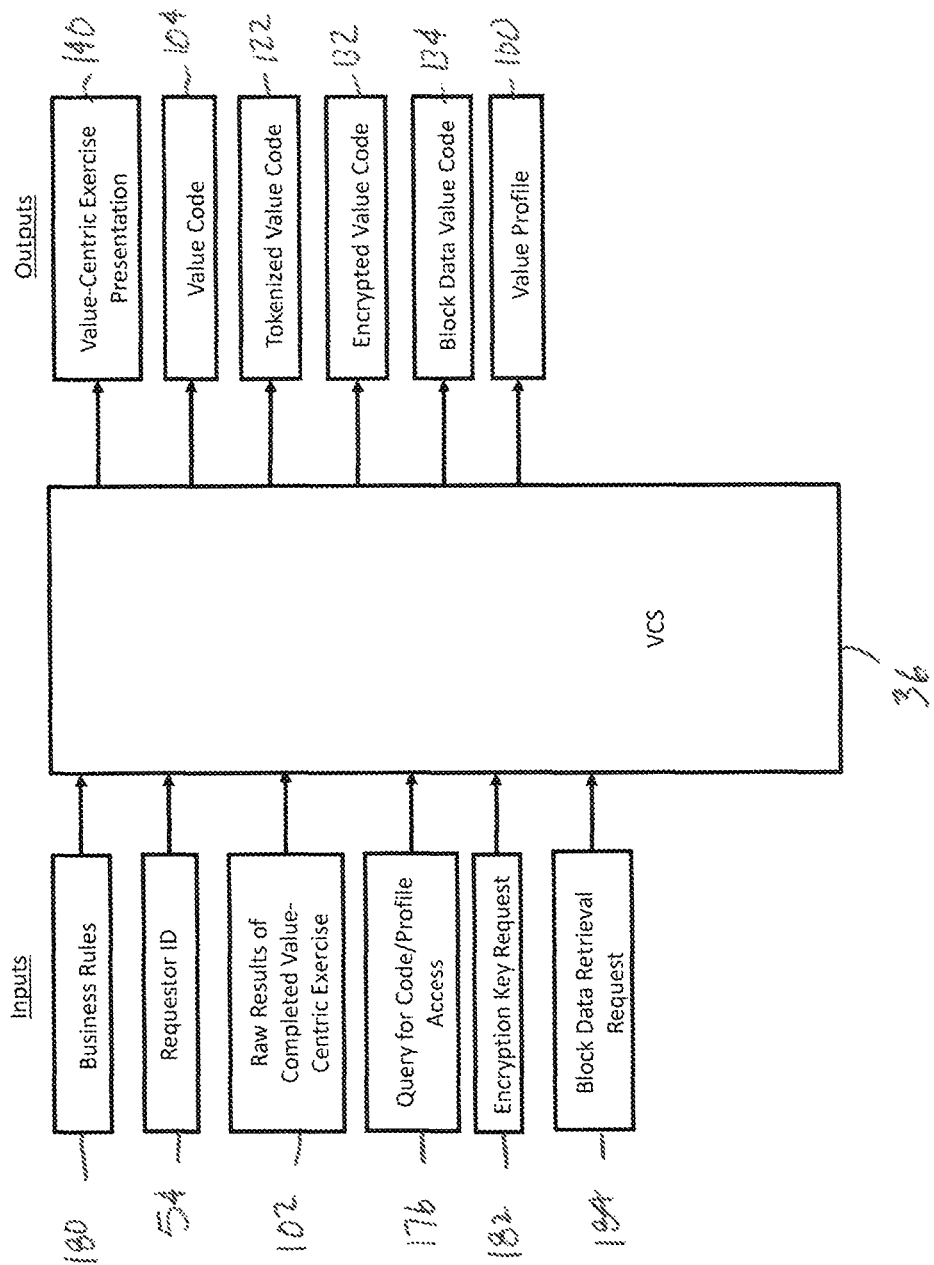
FIG. 7C is a block I/O diagram of an exemplary value analysis server that may be employed in the value preference capture funnel and coding system of FIG. 1.

Turning to FIGS. 7A-7C, the external inputs and outputs of the requestor device 32 (FIG. 7A), content provider server 34 (FIG. 7B), and VCS 36 (FIG. 7C) will now be described. As shown in FIG. 7A, the inputs coming into or being received by the requestor device include a login page display 50, the value-centric exercise 140 (or 240 or 340), and lastly, the requested content from the content provider server 34, either the originally requested content 62 or the altered content 64 in accordance with the captured value code 104. On the external output side is a restricted content access request 156, which is often a uniform resource locator (URL), or internet protocol (IP) address entered in a search box or address bar in the requestor's browser 39. Other output includes the login information 52 such as username or email address 54 and a password 56 (FIG. 1), and the raw results 102 of the value-centric exercise.

As shown in FIG. 7B the external inputs coming into the CPS 34 includes the restricted content access request 156 from the requester device 32, the login submission including the login information 52 (FIG. 1) from the requestor device (or via a third party authenticator), the value code 104 and/or value profile 100 (FIG. 3), together defined as the content altering guide, as well as a tokenized value code 122, encrypted value code 132, or block data value code 134 from the VCS 36 depending on the delivery and access mode as discussed below. In addition, an authentication notice 178 may be received if the login authentication process is managed by a third party as opposed to being generated internally if handled by the content provider server 34. In addition, a link, iFrame, or other embedded code 174 provided by the VCS 36 may be added to the CPS code for the entry page 50. On the external output side is the login page presentation 50, the requester ID 54. a query or request 176 to the VCS 36 for the tokenized value code 122 and/or value profile 100 associated with the requester ID 54 or 124 (if assigned by the VCS 36), an encryption key request 182 if provided with the encrypted value code 132, and a block data retrieval request 184 if provided with a block data value code 134 by the VCS 36. Other output includes the content, whether original content 62 or modified content 64 (FIG. 1), transmitted back to the requester device 32 after a successful login and completion of one of the value-based exercises 140, 240, or 340 and a set of business rules 180, that define how the content manager wants to display the value-based exercise and the mode for receiving the results, and a webhook address designation 175 for directing the results of the webhook 150 (FIG. 9) if used.

As shown in FIG. 7C the external inputs coming into the VCS 36 include the raw results 102 of the value-centric exercise 140 from the requestor device 32, the query 176 for the tokenized value code 130 and/or value based profile 100 or the encryption key request 182 or the block data retrieval request 184 from the CPS 34 depending on the value code delivery and access mode. Other input to the VCS 36 includes the set of business rules 180 and the requester ID 54 if provided, both from die CPS. On the external output side is the value-centric exercise 140 (or 240 or 340) transmitted to or rendered on the requestor device 32 following the request for access to the restricted site 48, as well as the tokenized value code 122 (FIG. 3), encrypted value code 132, or block data value code 134, or the value code 104 and/or value profile 100 provided to the CPS 34 depending on the delivery and access modes. While the foregoing as described in FIGS. 7A-7C represents an exemplary set of external inputs and outputs being transmitted among the respective devices and servers 32, 34, and 36, a number of internal processing steps within a particular device or server also take place as described further herein.

Figure 8:
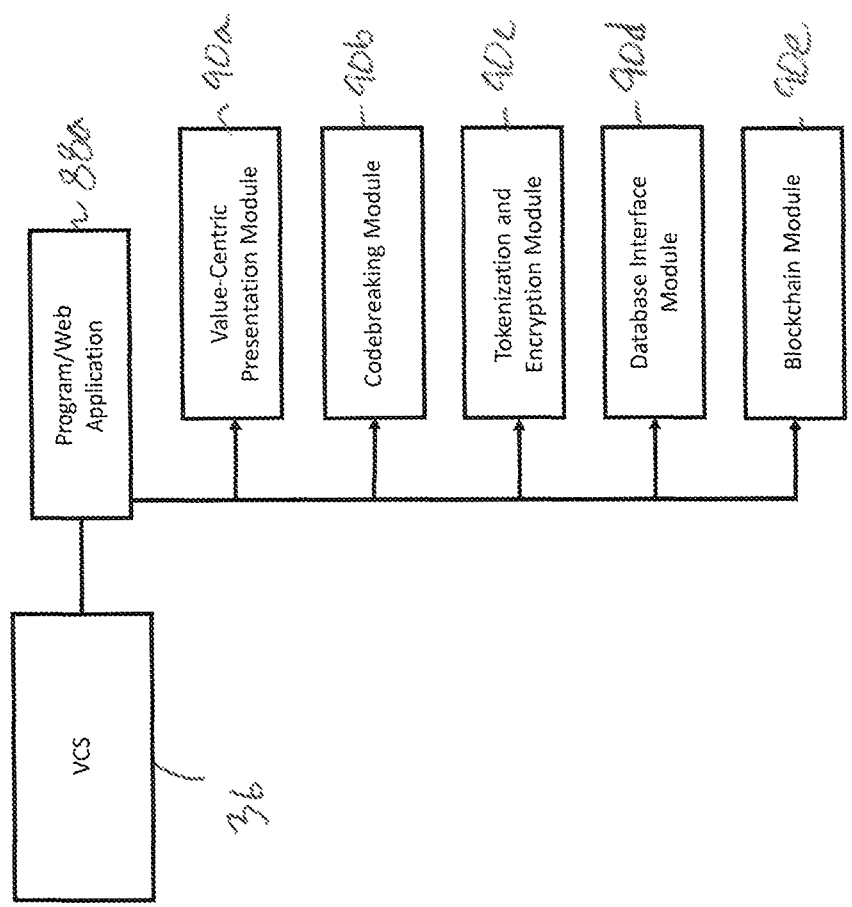
FIG. 8 is a block diagram illustrating a set of exemplary program modules that may reside on the value preference capture funnel and coding system server for use in the value preference capture funnel and coding system of FIG. 1.

Shown in FIG. 8, the value preference capture funnel and coding server 36 includes a program 88*a* or web app with a number of files, modules, or instruction blocks 90*a-e* that support the implementation of the value preference capture funnel and coding system 30. More specifically, the value preference capture funnel and coding program 88*a* includes, but is not limited to, the following exemplary modules: a presentation module 90*a*, a codebreaking module 90*b*, an encryption module 90*c*, a database interface module 90*d*, and a blockchain module 90*e*. It will be appreciated that the reference numeral 90 as used herein generally refers to a set of program instructions or modules within the program 88 of the requestor device 32 or either server 34, 36. Modules 90*a-e* specifically refer to the program modules in the VCS server 36 unless otherwise noted. The presentation module 90*a* is responsible for assembling, rendering, and/or presenting the value-based exercise 140 to the requestor 42. Some the processes managed by the presentation module 90*a* may take place prior to the content request 156 initiated by the requestor 42 while other steps may take place after the content request. The presentation module may access the value sets 144*a-d*, 146*a-d*, and the category symbols 145*a-d* associated with value-centric exercise 140 from FIG. 5A in the database 84 and use the value sets to generate the value-centric exercise 140 by placing a selected data set and symbol onto a card 148*a-d*. By accessing a mixture of symbols 145*a-d*, umbrella categories 144*a-d*, value sub-sets 146*a-d* stored in the database with the presentation module 90*a*, a large variety of card choices may be offered as part of the exercise 140. This allows for a number of unique combinations that may be used to generate the value code 104 following completion of the value-centric exercise 140. Assembly of the value-centric exercises 240, 340 may involve similar steps by selecting from the universe of value choice elements 135 and modifiers 136 in the database to generate the interactive exercise. Assembly of the value-centric exercise 140 (or 240 or 340) may occur by selection of a static template including pre-selected value-choice elements 135 or dynamically assembled from selections of the value choice elements 135 (FIG. 3) and incorporated into a display template or the entire set of display elements appearing in the value-centric exercise may be dynamically assembled. Such assembly may also be completely or partially dictated by a set of business rules 180 (FIG. 7B) obtained from the CPS 34 and including display preferences and constraints in order to blend the value-centric exercise in with the remainder of the entry page 50 for a more seamless user experience.

The codebreaking module 90*b* is responsible for transforming the raw results 102 of the value-centric exercise 140 into a representative symbol set or value code 104, Employing the codebreaking module 90*h*, the processor 72 transforms the raw results into a value code 104. As one codebreaking example, the raw results 102 may be parsed to determine the number of umbrella categories 144*a-d* and a representative symbol extracted from each category in the order assigned by the requestor and then aggregated into a resultant value code 104 based on the selected order of the umbrella categories 144*a-d* or their associated symbols 145*a-d* during completion of the value-based exercise 140 by the requester 42. In this example, the value code 104 would result in a code type 190 such as that shown in FIG. 6A. Such code represents an order of preference of the requester's values and motivations and is an important data set from which to learn how to tailor the original content 62 into the altered content 64 or segment the requestor pool 42. As shown in FIG. 5A for example, should the requestor select the cards associated with the symbols 145*a*, 145*b*, 145*c*, and 145*d* in that order, the codebreaking module 90*h* may generated the code BANK 170 (FIG. 6A) for that particular requestor. In this instance, such requestor 42 places the highest importance on the Blueprint category 145*a* value set 144*a*, 146*a* and the least importance on the Knowledge category 145*d* value set 144*d*, 146*d*. Another requestor may select the cards in the order of 148*c*, 148*b*, 148*a*, and 148*d* resulting in the codebreaking module 90*b* generating the code NABK. Depending on the choices made by the requester, a plurality of unique value codes in addition to these two examples may be generated depending on the order selected by the requester 42 as for example, BNAK, KNAB, and other unique four letter combinations being generated as codes that are representative of the requester's values and motivations along with a preferred order or weighting.

While instructing the requester 42 to sort the cards 148*a-d* on a broad umbrella category 144*a-d* basis is one method to support the generation of a value code 104, in other variations implementing the value preference capture funnel and coding system 30 the value-centric exercise 140 may also instruct the requester to further select, rank, or weight one or more of the sub-values 146a-d on each card as part of the exercise as described above With reference to FIGS. 5B and SC and resulting in the code type 290 of FIG. 6B. The umbrella categories 144a-d and sub-values 146a-d may also be weighted by the value preference capture funnel and coding system 30 independent of the choices of the requester 42 and such weighting may also be used as part of the value code generation process. Any instance of the raw results generated by the requester may be transformed into a symbolic or representative value code representing the value choices and preferences of the requester 42. The more value based information gathered from the requestor 42 during the value-centric exercise 104, the more likely the user of the value preference capture funnel and coding system 30 will gain an even deeper level of understanding or insights into the requestor's motivations and/or values and be able to improve the content tailoring process. Value codes 104 may be letters only, numbers only, an alphanumeric combination, icon based, pictorial, audio based, or seine other suitable value code 104 representative of the requestor's preferred value choices.

With the raw results 102 received and the value code generated 104, the codebreaking module 90b (also referred to the value transformation module or code generating module) may also determine which value profile 100 best fits or matches the value code. In some instances, the pool of available value codes 104 are known in advance and been previously assigned to a particular value profile 100 in the database 84. In other instances, once the value code 104 is generated and the value choices of the requestor known, the codebreaking module 90b may determine the closest matching value profile to the value preferences of the requestor 42. For example, if the value code is heavily weighted toward the Blueprint category 145a, then the value code would be associated with a value profile 100 that provides the best guidance for this category of requestor. This may be accomplished, for example, by matching value terms quantitatively in the guide to the value code preferences. If a profile 100 incorporates more Blueprint value category terms such as any of the following: Stability. Structure, Systems, Planning, Processes, Predictability, Responsibility, Duty, Rules, Credentials, Titles, and Tradition, then a Blueprint focused value code will be associated with such profile. This may be broken down further for each individual portion of the value code.

With continued reference to FIG. 8, the tokenization and encryption module 90c is responsible for either tokenizing the value code 104 or encrypting the transformed value code 104. In this exemplary embodiment, tokenization is the process of exchanging sensitive data (value code 104 and or unique requestor ID 54, 124) for non-sensitive data called tokens. The tokenized data is undecipherable with no mathematical relationship between the token and the original value code 104 and only represents the original value code. A detokenization process is required to exchange the token for the original value code. On the other hand, encryption involves mathematically altering the value code according to an encryption method. The encrypted value code may be decrypted with an appropriate key. In addition to the value code, other data such as the unique requestor ID 54 or 124, content provider ID 26, and a webhook address 128 may be tokenized or encrypted in the resulting data string which may be transmitted to or made accessible to the CPS 34. Standard tokenization and encryption techniques may be used accordingly. The tokenization and encryption module 90c is responsible for responding to a database query 176 for the detokenized value code or an encryption key request 182 to unlock the value code 104 from the encrypted version as issued by the CPS 34.

The database interface module 90d handles all queries and requests for data sets 86 in the database 84 as well as updating or modifying the data contained therein. More specifically, the value code 104 generated may be linked to a particular value profile 100 and a unique requestor ID 54 or 124. The tokenized value code 122, content provider ID 126, and webhook address 128 may be linked or otherwise associated with a particular unique requestor ID as may be the encrypted value code 132 or block data value code 134. Should the requestor perform a subsequent value-centric exercise 140, 240, 340 and the results differ, then the database may be updated accordingly. The database 84 also transfers the value centric exercise sets 105 and related value choice elements 135 and modifiers 36 if used to the presentation module 90a for rendering the value-centric exercises 140, 240, 340 (FIG. 5A-5C).

The blockchain module 90e is responsible for converting the transformed value code 104 into a data block 134 (FIG. 3). Once the data block is configured, a hashing algorithm is introduced and the hashed block introduced to the selected blockchain nodes of the blockchain being used for consensus. Once consensus is reached, the value code data block is added to the blockchain. The data block may include the transformed value code 104 and the unique requestor ID 54 or 124 and other pertinent data. The blockchain module is also responsible for retrieving the data block from the blockchain in response to a request 184 from the CPS 34. It will be appreciated that incorporation of the blockchain functionality may be useful to avoid the issue of multiple unique login IDs (e.g., multiple usernames or entails) associated with a single requestor 42. For example, the requestor 42 may use different login credentials 52, and more particularly different usernames or email addresses 54, when accessing, the same or different content provider servers 34 as many requestors will have more than one username or email address used as their unique requestor ID 54. While in some instances, the requester 42 may submit the same raw results 104 after performing the same value-centric exercise 140 type for each different login ID resulting in the same value code 104 for each different login ID, in other instances, the requestor may produce raw results 102 that generate a different value code, one tier each unique login ID. As the blockchain approach may be used assign a single unique requestor ID to the requestor 42 encompassing all known aliases regardless of the username or email address entered as part of the login credentials, a single unique requestor ID will be associated with a single value code for each requestor and added to the selected blockchain.

Figure 9:
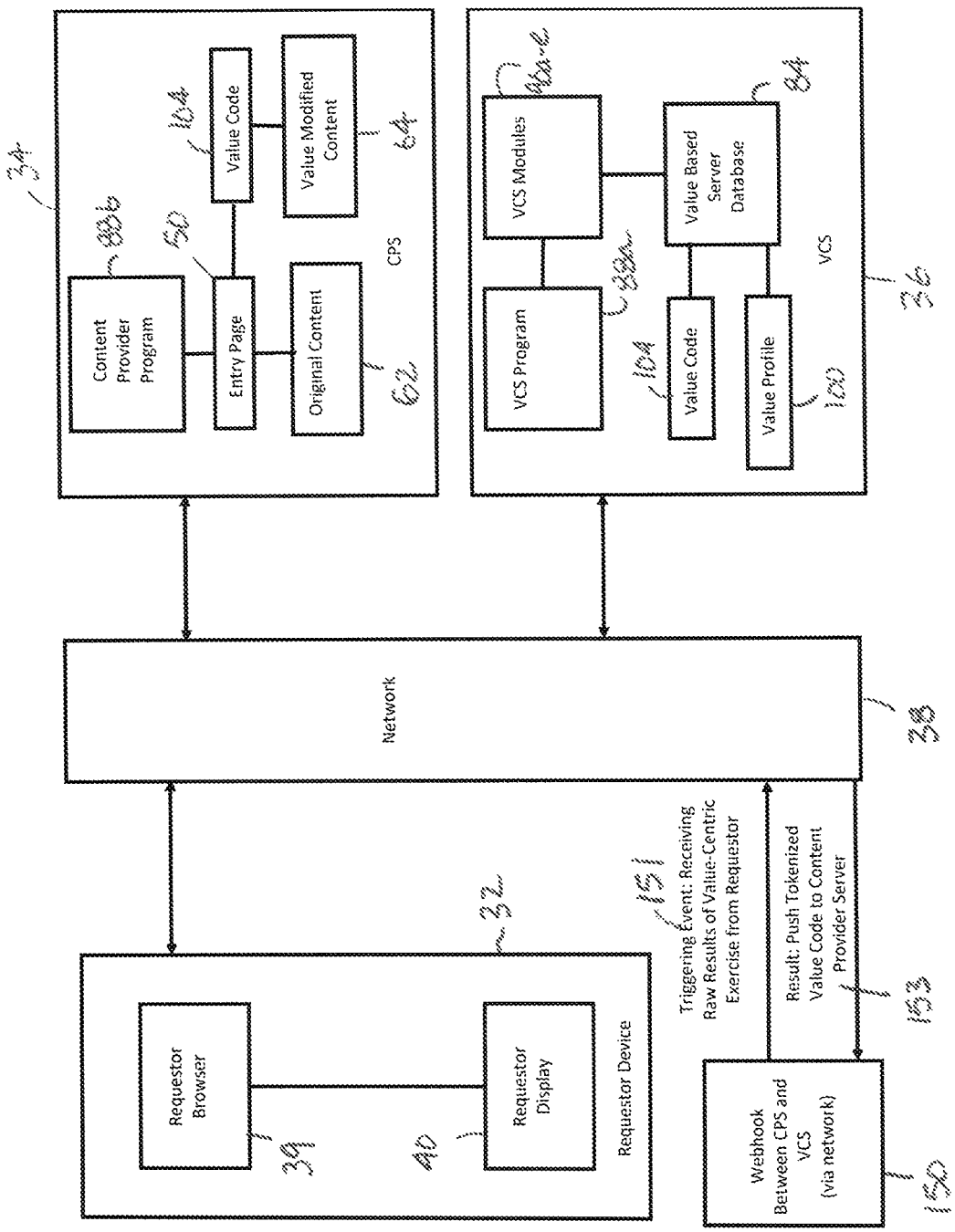
FIG. 9 is a block diagram illustrating several of the exemplary components from the value preference capture funnel and coding system of FIG. 1 and the flow of communication between the components.

With reference to FIG. 9, the value preference capture funnel and coding server 36 includes a first program (the VCS program) or web application 88a resident on the VCS 36 that May be tied into a second program or web application 88h resident on the content provider server 34 using a webhook 150 to exchange at least some of the data. It will be appreciated that reference numeral 88 is used for referring generally to a program resident in or loaded into a client device 32 or server 34, 36 while reference numeral 88a specifically refers to the program in the VCS 36 and reference numeral 88b specifically refers to the program in the CPS 34 unless otherwise noted. When the requestor 42 completes and submits the raw results 102 of the value-centric exercises 140, 240, 340 (FIGS. 5A-5C) back to the VCS 36, this initiates a triggering event 151 as per the webhook 150. In response, the VCS 36 processes the raw data 102 (FIG. 3) into a value code 104 and then into a tokenized value code 122 including the requestor ID 124, content provider ID 126, webhook address 128, and timestamp 130. The results 153 of the webhook 150 are then transferred to a designated uniform resource locator (URL) or other designated location 128 established by the CPS 34 as determined by the business rules 180. The tokenized value code 122 serves at least two purposes. First, receipt of the tokenized value code 122 indicates that the requestor 42 has completed the value-centric exercise 140 (FIG. 5A) allowing the CPS 34 to grant access to the content 62 requested by the requester, assuming the login II) 52 was authenticated on the login page 50. Second, receipt of the tokenized value code 122 enables the CPS 34 to then issue a query 176 (FIG. 6B) to the VCS 36 to obtain, retrieve, download, or otherwise gain access to either the detokenized value code 104, the value profile 100*a* associated with the requestor's specific value code 104, or both. With the value code and/or value profile shared with the content manager 60, the original content 62 may be modified to improve the requestor's user experience by presenting more tailored of customized digital content 64 or advertising aligned with requestor's preferred values and motivations for accessing the content. It will be appreciated that the process for encrypted value code 132 and block data value code 134 are generally similar in respect to their issuance and retrieval hut are explained in more detail below in reference to FIGS. 10A-111).

Alternatively, an application programming interface (API) may be used instead of a webhook 150. In such instance, the API on the value preference capture funnel and coding server 36 side would continuously or periodically poll the content provider server 34 to determine if any requests have been made by a requestor 42 to the restricted access site 48. Another polling instance directed by an API may occur with the VCS processor 72 being responsive to a polling request from the CPS 34 for the value code 104 or access to the value code.

Web-based implementation of the VCF system 30 may take place over a cloud-based system hosted on an IBM Cloud Virtual Machine using a LAMP stack wherein Linux is the operating system. Apache is the web server, MySQL is the relational database management system to support database construction and queries and built with IRP as the programming language for creating dynamic web pages among other capabilities. Another suitable implementation takes place in the Microsoft .NET framework with Angular front end and hosted on Azure. The VCF system may be implemented as a mobile application or a native mobile application as well. A suitable database may be a relational database created using SQL and managed using My SQL. It will be appreciated that the VCF system 30 implementation primarily takes place on the VCS 36 with inputs received from the CPS 34 and the requester device 32 while outputs are mainly directed at the CPS. Thus, the VCF system 30 shown in FIG. 1 represents the general architecture environment in which the VCF 30 operates but the VCS 36 itself forms the core of the system. It will be appreciated that implementation of the VFC system 30 may take place on a single server or computer device or across multiple such devices.

Figure 10A:
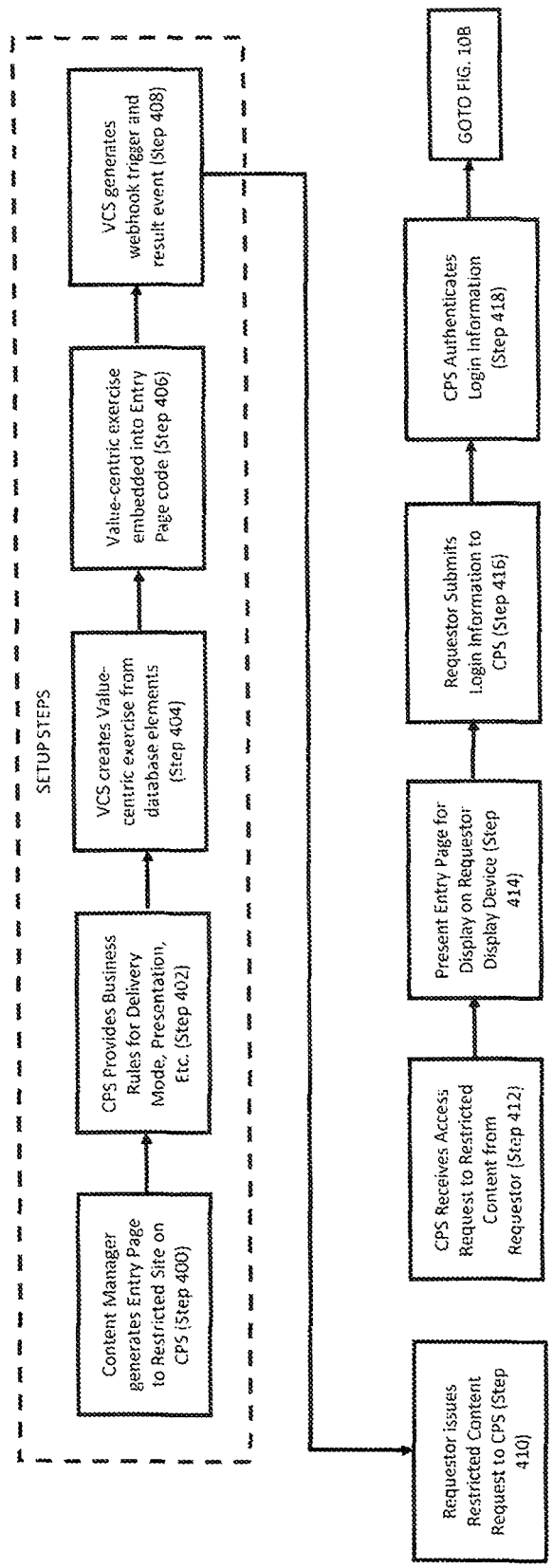
FIG. 10A-10D illustrate a series of process diagrams illustrating an exemplary value preference capture funnel and coding method with access sequence altering and content modification features for a new client.
Figure 10B:
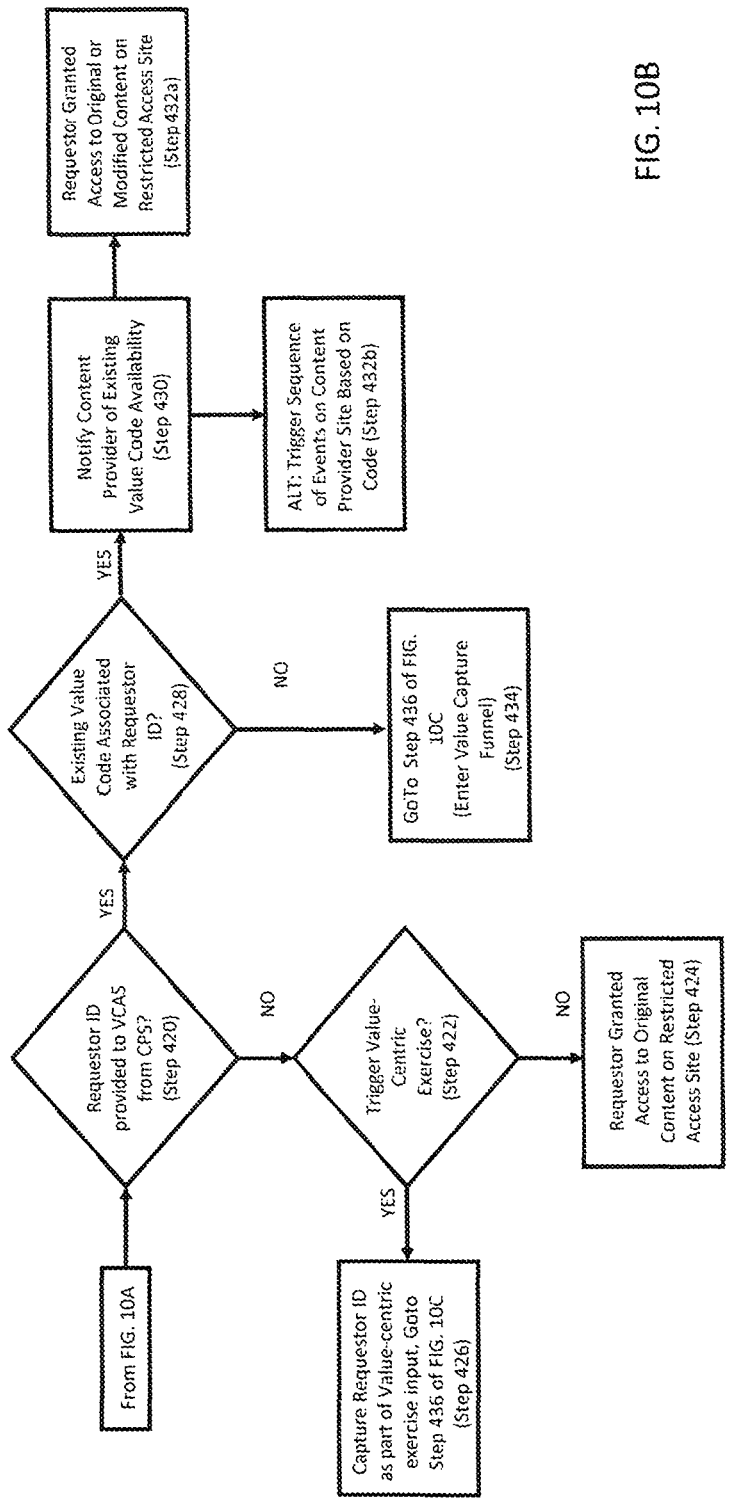
Figure 10C:
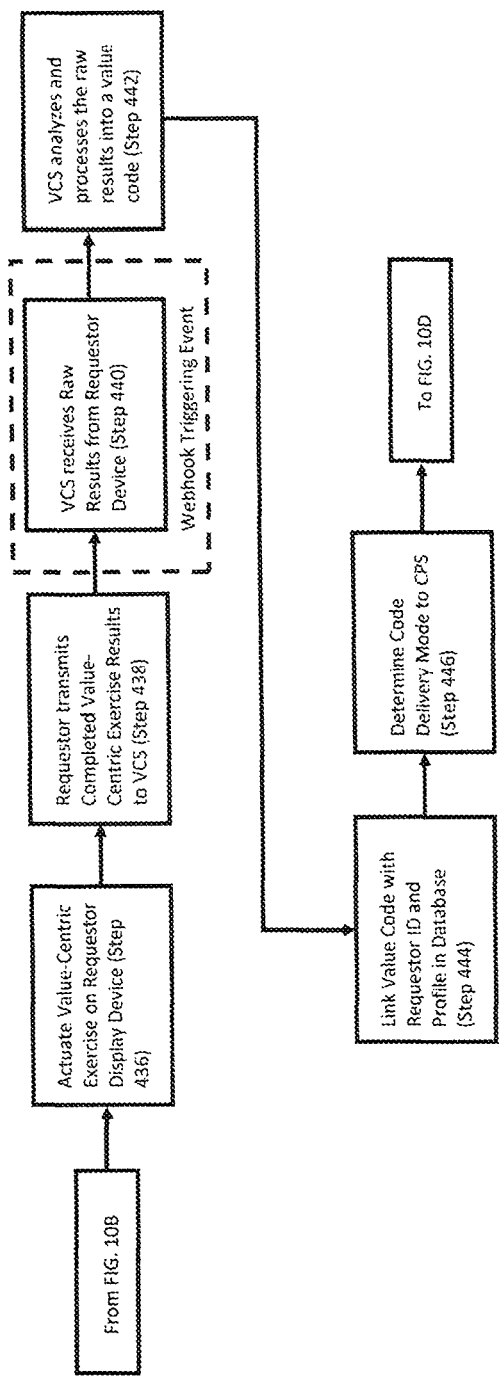

Referring now to FIGS. 10A-C, the process for altering a conventional login sequence to capture value preference based data from the requestor 42 and converting the captured data into a tool that may be used to customize or otherwise tailor the requested content 62 to enrich the user experience of the requestor and/or drive the interaction between the requestor and content provides towards a goal will now be described. In this first exemplary embodiment, the requestor 42 is assumed to be a new user 46 without an existing account with the CPS 34 and who hasn't performed one of the exemplary value-centric exercises 140, 240, or 340.

Before the process starts, a number of pre-process setups steps are assumed to be completed as will be described in referenced to FIG. 10A. At step 400, the content manager 60 (FIG. 1) generates the code for the entry page 50 and the original content 62 on the restricted site 48 and makes the site available on the network 38 through the CPS 34. The content manager or CPS administrator may also provide the business rules 180 (FIG. 7C) listing the specifications for the appearance and location of the iFrame 164 (FIG. 4), webhook address 128 (FIG. 3), and preferred delivery mode of the transformed value code 104 (FIG. 3) to the VCS 36 at step 402. It will be appreciated the business rules are preferences and, if not provided, does not prevent the implementation of the VCF system 30 since the VCF system 30 can generate the required outputs even without a set of business rules by using, default settings established by the VCS 36 or preferred business practices to display the value-centric exercise 140, 240, or 340. The value-centric presentation module 90*a* (FIG. 8) of the VCS 36 program 88*a* (FIG. 9) accesses the database 84 and selects from the universe of value choice elements 135 and one or more modifiers 136 if desired to create the value-centric exercise 140 (or 240 or 340) at step 404. The value-centric exercise may be embedded into the code of the login page 50 at step 406. It will be appreciated that the value-centric exercise may be embedded directly into the code of the login page, inserted as a redirect link, included as an iFrame or a triggered popup to operate with the CPS environment, or other suitable implementation in which the value-centric exercise either appears within the confines of the login page or as part of a redirected page. The webhook trigger and result event are programmed by the program 88*a* of the VCS server 36 at step 408. It will be appreciated that the pre-process steps 400-408 are preferably in place before the requestor 42 generates a request for the restricted content site 48 but are not required in their entirety to implement the VCF system 30.

With continued reference to FIG. 10A, the requestor 42 generates an access request to the restricted content site 48 of the CPS 34 using their input device 94 (FIG. 2) and web browser 39 (FIG. 1) on the requestor device 32 using conventional web browsing navigation techniques at step 410. In this example, the requested digital content 62 is behind an access wall requiring login credentials 52 (FIGS. 1, 7A) to access. The CPS 34 receives the access request 156 (FIG. 7A) from the requester device 32 over the network 38 at step 412. In response, the CPS transmits the login page 50 to the requester device 32 for display on the requester display 40 at step 414. In this exemplary embodiment, the login page 50 includes the embedded code resulting in the display of the value-centric exercise 140 as shown in FIG. 4. The requester 42 enters their login credentials 52 including the username or email address 54 and a password 56 (FIGS. 1 and 4) and submits them by selecting the login button 57. The CPS then authenticates the login credentials 52 of the requester using an authenticator 58 (FIG. 1) at step 418. If the credentials are not authenticated, then the requester is simply denied access to the restricted content site 48 or offered a chalice to retry the login process depending on the login protocols established by the content provider. Steps 410-418 generally represent a conventional login process except for the display of the value-centric exercise 140 on the login page 50. At this point in a conventional process, the requester 42 would be granted access to the newly released content 62 if the login information 52 was authentic. It will be appreciated that such original content 62 is not tailored or customized according to the motivations and/or values of the individual requester 42 and is simply a one-sized fits all display of content as the conventional login information offers no insight into the requester's motivation for seeking or using the content 62 by the content provider server 34.

Turning now to FIG. 10B, after the requester's login credentials 52 have been authenticated, the VCS 36 determines if the unique requester ID 54 has been forwarded from the CPS 34 at step 420. If the unique requester ID has not been passed to the VCS, then the CPS determines whether to actuate the value-centric exercise 140 on the login page 50 at step 422. If the value-centric exercise is not actuated, then the requester 42 is simply granted access to the restricted access site 48 as would occur with a conventional login at step 424. If the value-centric exercise is actuated, then the requester enters the value capture funnel that continues with FIG. 10C as discussed below at step 426. On the other hand, if the requester ID 54 is provided to the VCS 36 by the CPS 34, then the database interface module 90d of the program 88a of the VCS searches the database 84 for a matching unique requester ID 54 at step 428. If a matching requester ID is found, then a query for an associated pre-existing value code 104 is issued. If an associated pre-existing value code is located in the database 84, then the CPS 34 is notified of the availability of a pre-existing code 104 at step 430. As a value code associated with the requester's ID has already been captured and processed, this indicates that the requester has already undertaken the value-centric exercise 140. Therefore, the requester 42 is not required to undertake the value-centric exercise 140, 240, or 340 and is granted access to the original content 62 or the modified content 64 based on the value code 104 at step 432a. Alternatively, a sequence of events may be triggered on the restricted content site 48 based on the pre-existing value code 104 and/or the event sequence 113 of the associated value profile 100 (FIG. 3) assuming a value profile has been linked to the pre-existing value code. It will be appreciated that this is an unlikely scenario for a new user 46 since by definition the new user would not have entered login credentials or undertaken the value-centric exercise. However, there may be a scenario where the requester is a new user to the requested content site 48 but has undertaken the value-centric exercise using the same requester ID on a different site and has been stored in the database 84 accordingly, in such case, the new user may not be forced to take the value-centric exercise again. On the other hand, as this is a new user scenario, it is more likely that an existing value code will not be found in the database 84 by the VCS program 88a. In that case, the process continues by entering the value capture funnel that continues with FIG. 10C as discussed below at step 434.

Continuing the process at FIG. 10C, the requester 42 has now entered the value capture funnel starting with step 436 wherein the value-centric exercise 140 is actuated on the login page 50 or otherwise presented to the requester 42. Therefore, instead of being granted direct access to the restricted content site 48 upon successful authentication by the authenticator 58 (FIG. 1), the conventional login process is interrupted and the requester is diverted or funneled into the value-centric exercise 140, 240, or 340. This funneling process results in the value-centric exercise 140, 240, 340 being presented on the requester's display device 40 such as provided by the iFrame region 164 on the login page 50 (FIG. 4) at step 438. The requester performs the exercise by sorting the cards 148a-d (FIG. 5A) of the exercise 140 for example. Once the exercise is completed, the requester selects the submit button 149 on the interactive iFrame 164 (FIG. 4) to submit the raw results 102 of the exercise from the requester device 32 to the VCS 36 at step 438. Receipt of the raw results from the requester device 32 triggers the webhook 150 (FIG. 9) at step 440. With the raw results obtained from the requester 42, the processor 72 of the VCS 36 invokes the codebreaking module 90b (FIG. 8) of the program 88a (FIG. 9) to process and transform the raw results 102 into a value code 104 at step 442. With the value code determined and formatted according to the value code type 190 or 290 as shown in FIGS. 6A, 6B, respectively, the value code is added to the database 84 and linked to the unique requester ID 54 and may be linked to a value profile 100 as well at step 444. It will be appreciated that the unique requester ID may be collected from the requester 42 through an entry box 166 in the value-centric exercise 140 (FIG. 4) if the unique requester ID 54 was not passed from the CPS 34. The CPS may also provide a different unique requester ID than entered by the requester for an extra layer of security. Alternatively, the VCS may assign its own unique requester ID 124 to the requester 42 for entry in the database 84. Unique requester ID 54 is the VCS side unique requester ID, which is typically the username or email address of the requester used as one part of the login credentials 52. On the other hand, unique requester H) 124 is the VCS side identifier and may be the same or different from the VCS side unique requester ID 54. At the next step 446, the delivery mode for the value code 104 is determined by the VCS 36. The delivery mode may be dictated by the business rules 180 (FIG. 7B) and implemented into the webhook 150. Alternatively, the VCS program 88a may dictate the delivery mode.

Figure 10D:
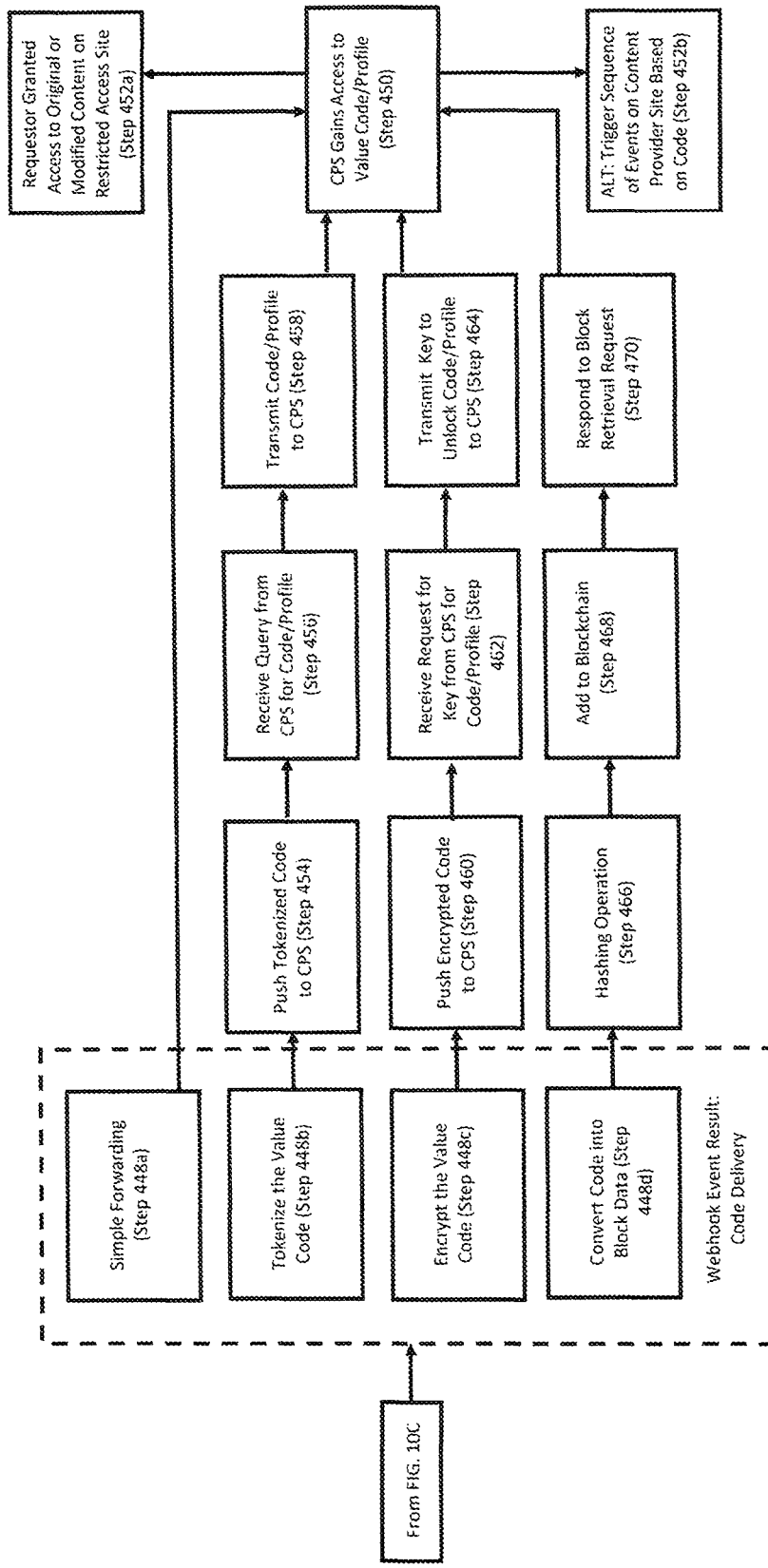

The process continues at FIG. 10D. In this exemplary embodiment, there are a set of delivery modes and related access modes that follow one of four paths. It will be appreciated the delivery mode of the value code 104 may be the same as the access mode as in the first path. However, in other modes, the delivery mode may provide a means fir accessing the actual value code and not the code itself as explained below. In the first delivery mode, the value code 104 and/or linked value profile 100 is simply forwarded from the VCS 36 to the CPS 34 at step 448a. The CPS 34 gains direct access to the value code 104 and/or linked value profile 100. With the value code known as well as the guidance provided by the associated value profile 100, the content manager 60 may alter the original content 62 into an altered content presentation 64. The content manager may choose to deliver either the original content 62 or the altered content 64 to the requester device 32 at step 452a. Depending on the capabilities of the CPS 34, the content may be altered prior to granting access to the content or on a subsequent visit to or interaction with the restricted content site 48. Alternatively, receipt of the value code 104 may trigger an event sequence 113 determined by the value profile 100 at step 452b.

With continued reference to FIG. 10D, the second path presents a delivery mode wherein the VCS 36 tokenizes the value code 104 at step 448b. The tokenized value code 122 may incorporate one or more of the following: the actual value code 104 or portion thereof, the requester ID 54 or 124, the content provider ID 126, the webhook address 128, and/or a timestamp 130. The tokenized code 122 is then pushed to the CPS 34 at step 454. The tokenized value code may be used to form the basis of a query 176 (FIG. 7A) that may be requested by the CPS. The VCS receives the query from the CPS at step 456. The VCS then processes the query using the database interface module 90*d* and reveals the value code or makes the value code accessible to the CPS at step 458 either permanently or on a limited duration. With the value code known at step 450, the CPS has the same path options 452*a*, 452*b* as above.

Still referring to FIG. 10D, the third path depicts a delivery mode wherein the VCS first encrypts the value code 104 at step 448*c*. The encrypted value code 132 (FIGS. 3 and 7B) is pushed to the CPS 34 at step 460. The CPS issues a request 182 (FIG. 7B) for the encryption key which is received by the VCS 36 at step 462. The key is transmitted to the CPS to unlock the encrypted value code 132 at step 464 to reveal the value code 104. With the value code 104 known to the content manager 60 at step 450, the same path options 452*a*, 452*b* open up.

The fourth delivery mode path as depicted in the FIG. 10D depicts a delivery mode wherein the value code 104 is converted into a block data 134 (FIG. 3) at step 448*d*. A hashing operation is performed at step 466 and the value code 104 is added to a selected blockchain at step 468. The CPS is notified of the addition of the value code to a blockchain and may issue a request 184 (FIG. 7B) for a blockchain retrieval. The VCS 36 responds to the retrieval request 184 and provides or otherwise reveals the value code 104 to the CPS at step 470. With the value code known at step 450, the same path options 452*a*, 452*b* open up.

Figure 11A:
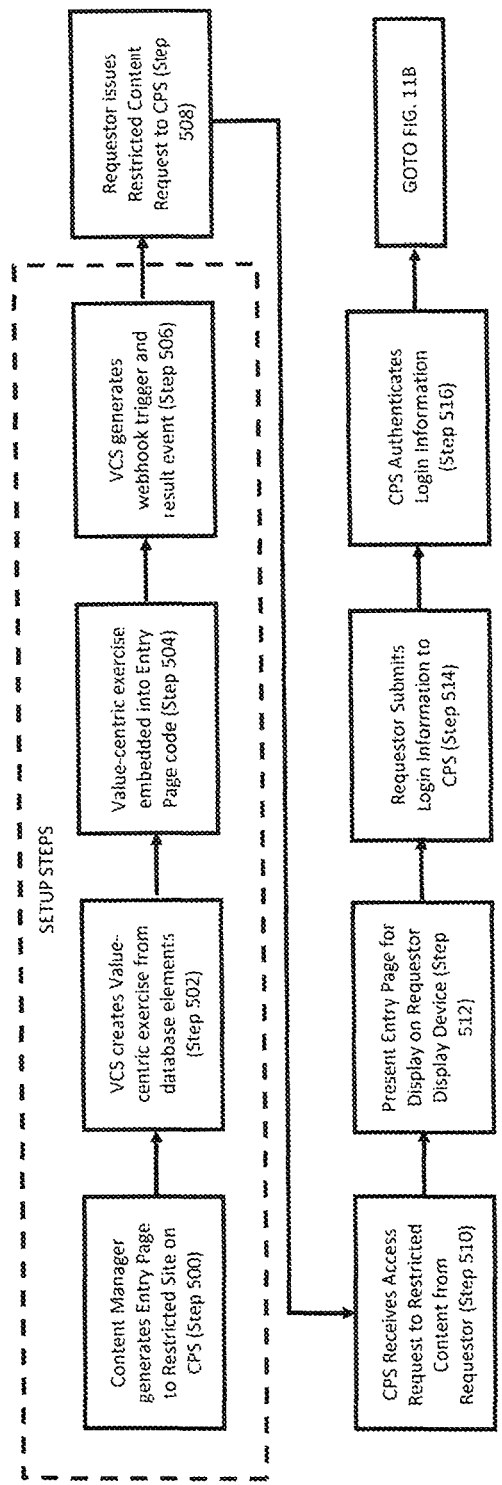
FIG. 11A-D is a series of process diagrams illustrating an exemplary value preference capture funnel and coding method with access sequence altering and content modification features for an existing client.

Turning now to FIGS. 11A-D, an exemplary process to be implemented for a requestor 42 with existing accounts 44 (FIG. 1) will now be described. In this exemplary embodiment, it is assumed that the requestor has previously visited the restricted content site 48 and set up an account with their login credentials 52 including a username or other unique requestor ID 54 and a password 56. The requestor may or may not have performed the value-centric exercise 140, however. In addition, the requestor may opt to undertake the value-centric exercise again or the CPS may require the requestor to retake or update the value-centric exercise. Each of these scenarios is addressed in the following process. The beginning steps 500-518 of the process as shown in FIG. 11A are identical to their like numbered counterparts 400-418 in FIG. 10A and will not be repeated here as the setup and conventional login processes are the same for both new and existing client scenarios.

Figure 11B:
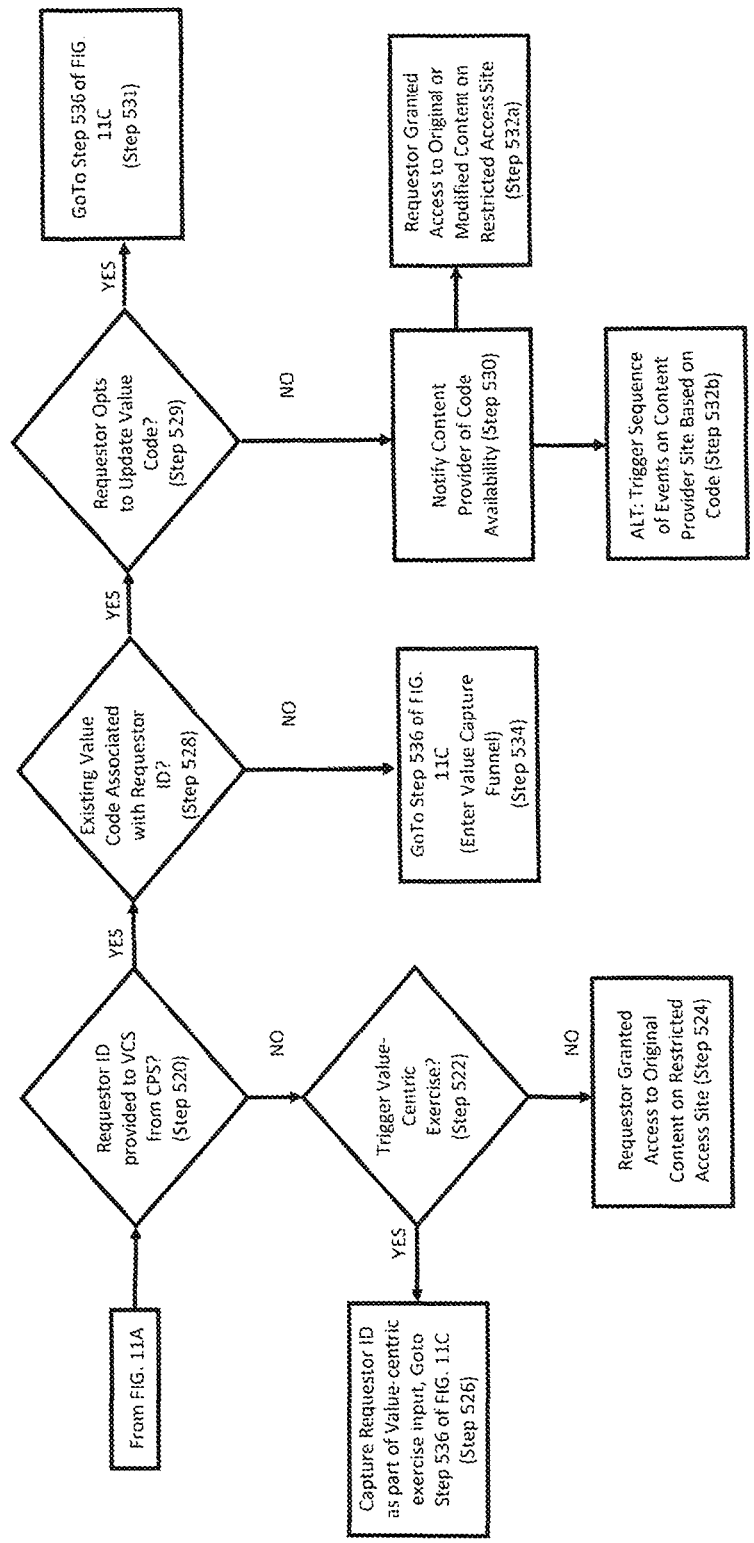

Turning now to FIG. 11B, steps 520, 522, 524, 526, 528, 530, 532*a*-*b*, and 534 are identical to their like numbered counterparts 420, 422, 424, 426, 428, 430, 437*a*-*b*, and 434 in FIG. 10B. The process is altered, however, if a determination is made that the requester 42 has an existing value code 104 in the database 84 at step 528. In that case, the requestor is allowed to opt in to update their value code 104 by retaking the value-centric exercise 140 at step 529. If they opt out, the process continues as with a new client and follows steps 530, 532*a* or 532*h* which are identical to their like counterparts in FIG. 10B. On the other hand, the requestor opts in, which may occur by selecting the update button 168 in the value-centric exercise region 164 (FIG. 4). Alternatively, the CPS 34 may conduct a forced logout of the requestor, especially for those for which no value code 104 is stored in the database 84. Such forced logout requires the existing account requestor 42 to re-enter their login credentials 52 on the login page 50 where the value-centric exercise 140 is presented and required to complete before access is granted to the restricted content site 48.

Figure 11C:
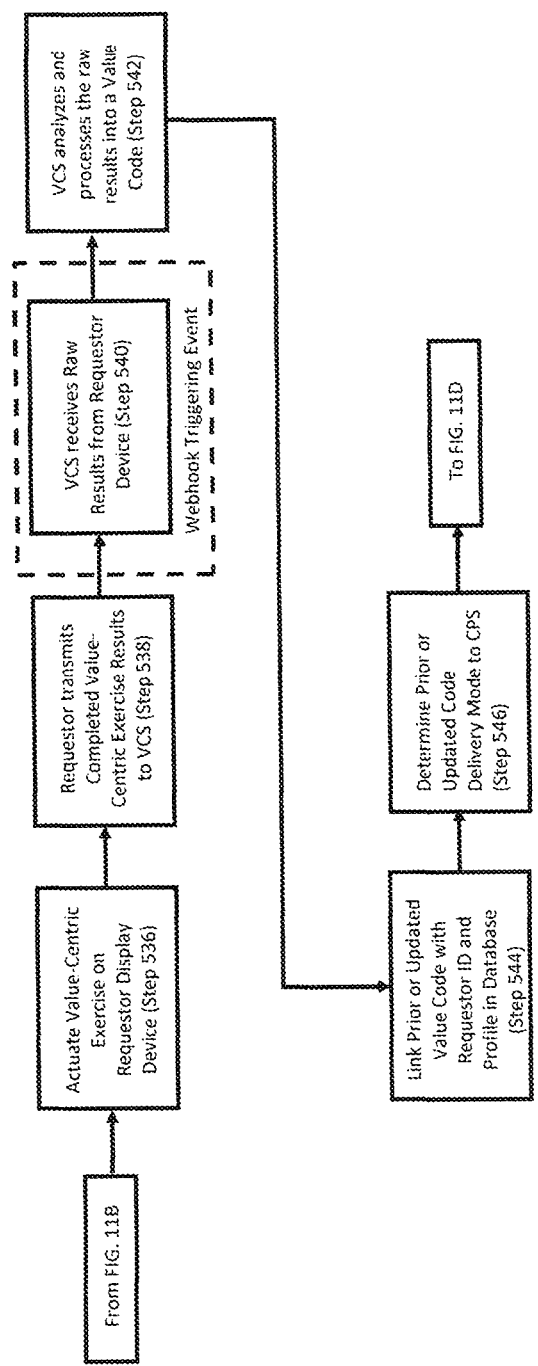

Referring now to FIG. 11C, steps 536, 538, 540, 542, and 546 are identical to their like numbered counterparts 436, 438, 440, 442, and 446 in FIG. 10C, This portion of the process (the value capture funnel) is slightly altered at step 544 wherein the database interface module 90*d* (FIG. 8) of the VCS program 88*a* (FIG. 9) links an existing value code 104 and requestor ID 54 to a value profile 100 in the database 84 or links an updated value code and requestor ID to a value profile 100 in the database depending on whether an existing value code or updated value code is generated by the VCS codebreaking module 90*b* as driven by the requestor's option to either ignore or elect the update value code process.

Figure 11D:
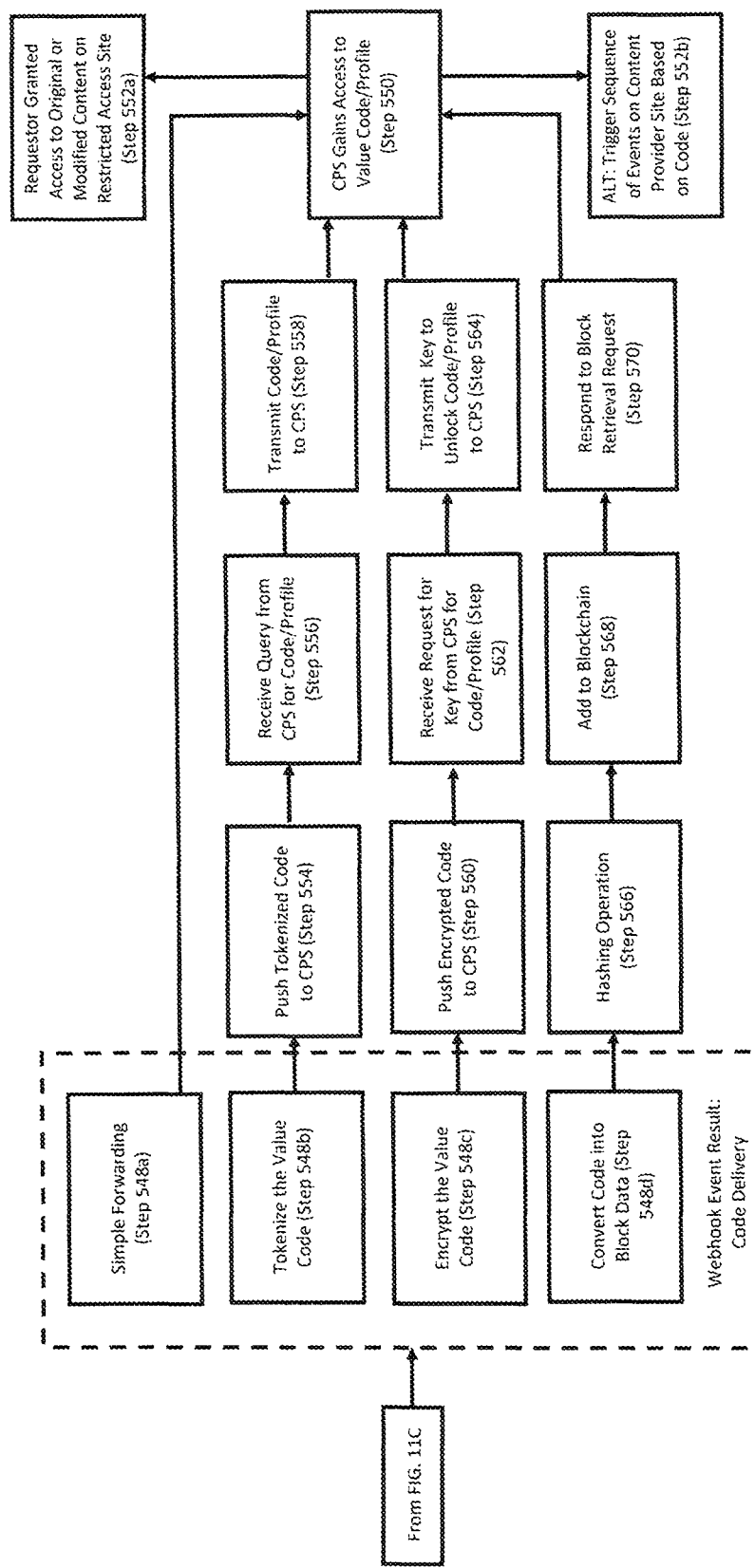

With reference to FIG. 11D, the delivery mode steps 548*a*-*d* all the way through steps 552*a*-*b* are identical to their like numbered steps 448*a*-*d* through 452*a*-*b* in FIG. 10D and will not be repeated as the delivery mode process is the same for both new and existing client scenarios.

It will be appreciated that there are at least five transformations of either data or sequences taking place in the implementation of the value preference capture funnel and coding system 30 (FIG. 1). In no particular order, the first transformation is the alteration of a conventional login sequence by interrupting the process and requiring completion of a value-centric exercise prior to granting access to the requested content. The second is transforming, encoding, or enciphering the raw results 102 of the value-based exercise 140 into a value code 104 that represents a set of value preferences from selected universe of values or motivations of the requestor 42. The third is determining which value profile 100 to associate the value code 104 and linking them in the database 84. The fourth is determining a delivery mode that involves direct delivery of the value code as is or forwarding to the content provider in a tokenized state, an encrypted state, or a block data state. The fifth is transforming a query, decryption, or retrieval request from the content provider 34 back into the value code 104 and/or value profile 100 and either providing access to the value code and/or value profile or returning a copy of the value code and/or value profile. Such transformations contribute to improving the user experience and quality and relevance of digital content presentations between a content requestor and a content provider. Implementation of the VCF system 30 produces the tools to create a more efficient interaction between the parties. More efficient interaction also improves the computer and networking technologies by reducing the amount of data needed per transaction, reducing the waste of unnecessary bandwidth, and a reducing the amount of programming resources needed to implement an exchange between the content provider and the content requestor. In at least one implementation, the VCF system essentially provides a value-based roadmap to the information and user experience being sought.

Some representative advantages of the value preference capture funnel and coding system 30 that may be accomplished by one or more embodiments discussed herein include avoiding the privacy issues associated with using privileged login information often obtained and used for data mining purposes. For example, the value preference capture funnel and coding server 36 may obtain and process the value preferences of a digital content requestor without any information regarding the requestor's username 54 and password 56 or other unmodified login ID 52 information as the process may be triggered simply by presenting a value-centric exercise at an entry point and receiving a substitute username or email without capturing the login details of the digital content requestor. Alternatively, the VCS 36 may assign in an independent internal unique identifier 124 (FIG. 3) to the requestor 42 for internal purposes. A requestor's username 54 obtained from the digital content server 34 may be encoded prior to transmission to the VCSS 36 as well so the original username 54 is not known to the VCS as well. Such approaches add security features to the implementation of the value preference capture funnel and coding system 30. The value preference capture funnel and coding system 30 may also implement encoding and encryption of personal value choice information to add further security features.

The value preference capture funnel and coding system. 30 also takes the guesswork out of data mining or gathering psychological profiles and reduces the computing time compared to the time required to undertake such tasks. Instead, the value preference capture funnel and coding system 30 is more direct by simply having the requester 42 indicate what they value and what importance is placed on a selected set of values, encoding the results, and providing a secure communication to a content provider 34 along with access to a content tailoring guide 100.

The value preference capture funnel and coding system 30 also takes place at point of entry 50 of a content provider 34 using that location as a natural funnel point and aspires to make the login process as seamless as possible. By employing the value preference capture funnel and coding system 30 prior to granting access, the content provider 34 is afforded an opportunity to tailor the content behind the access wall 50, either in real time or near real time on the initial visit or on subsequent visits. It will be appreciated that acquiring customer motivations and value preferences prior to granting access to a digital content presentation reduces the overall time to build the digital presentation as the content may be better tailored to suit a customer's preferences. In addition, the digital presentation may better target a specific audience segment based on common value preferences and therefore provides more user focused content. The value preference capture funnel and coding system 30 also supports tailoring of both content and advertising and may remove the need for tracking cookies.

Other Potential Uses of the VCF System 30: The value preference capture funnel and coding system 30 may also be used by the content manager 60 to segment the requester pool 42. For example, the content manager may create content 64 that focuses on the Blueprint oriented pool, the Action oriented pool, the Nurturing oriented pool, the Knowledge oriented pool, either individually or in combination depending on the value codes 104 associated with the requester pool 42.

The value preference capture funnel and coding system 30 may also be used to improve the measure of the emotional intelligence (EI) or emotional quotient (EQ) of the content provider 34 by providing insights into the value and motivations of the requester pool 42. For example, a content provider with the understanding that a requester's primary value is nurturing will have the information to tailor their cement that focuses more on a nurturing requester.

In other use, the VCF system 30 generates a tool that may be used for recruiting purposes. For example, depending on the job opening requirements, recruiters may require the candidates to undertake the value-centric exercise 140, 240, or 340 and provide their results. With the results in hand, the recruiter may focus their efforts on particular value codes.

As discussed above, the greater detail provided in a value code such as that shown in FIG. 6B allows for a comparison to a benchmark or scale and allows for the development of subsequent growth paths to improve scores indicated by the value code in each category.

In this disclosure, the term "value" is generally meant to include the requester's motivations for selecting goals and, making decisions necessary to accomplish those goals, as well as the governing principles they rely on during interactions and how they prefer to interact with other parties or presentations. It will also be appreciated that digital content or presentation also refers to advertising (ads) that may be tailored in accordance with the value code 104 and/or value profile 100.

"Point of entry" or "entry point" may include account creation or modification, initial login, subsequent logins, or other entry to a content provider's site, whether restricted or not. In some instances, a requestor 32 may be forced out of a current login status in order to initiate the modified login sequence. With a value code 104 associated with a unique requester ID 54, 124 in the database 84 resulting from the requestor having previously undertaken the value-centric exercise 140, the content provider may decide to omit the need to undertake subsequent modified logins and use a conventional login instead. If the content provider does not have a previously generated value code, a new query or request for the existing value code may be generated and submitted to the value preference capture funnel and coding system 30.

While the foregoing description discusses digital content that may include content presented in audio format, video format, text format or a mixture thereof, it will be appreciated that hard copies of the digital content may also be altered in accordance with the captured value data.

The value preference capture funnel and coding system 30 has been primarily described as being implemented in a client-server cloud based architecture. This is not meant to be limiting and other suitable networked architectures will occur to one of ordinary skill in the art.

Specific embodiments and applications of a value preference capture funnel and coding system for altering an access sequence, capturing value based data of a requestor, and generating a coded tool to use for subsequently tailoring or customizing one more digital presentations in accordance with an analysis of the captured value data have been described herein. However, it should be apparent, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Any objects cited herein may or may not be applicable to each embodiment and not all objects need be accomplished by any single embodiment.

What is claimed is:

1. A system for capturing interaction value preference based data from a content requestor using a display device during an authentication sequence to a digital content presentation provided by a digital content provider, the system comprising:
   a data storage device storing a universe of interaction value listings and further constructed to store at least one interaction based value code following completion of at least one value-centric exercise by the content requestor; and at least one processor in communication with the data storage device and including a non-transitory storage medium having one or more processor executable programming instructions that, when executed, cause the processor to:

assemble at least one interactive value-centric exercise by grouping together those interaction value listings having a common interaction trait from among the universe of interaction value listings into a plurality of interaction value listing sets with each interaction value listing set defining a distinctive mode of interaction and having a category indicator representative of a respective mode of interaction, the at least one value-centric exercise being constructed to require the content requestor to selectively assign an order to the interaction value listing sets that aligns with the content requestor's preferred modes of interaction with the digital content presentation, wherein the value-centric exercise presents a choice to determine the order to preferred modes of interaction from among interaction mode categories of Blueprint, Action, Nurturing, and Knowledge on the content requestor's display;

following a first time request to initiate an authentication sequence by the content requestor to a restricted access digital content presentation provided by the content provider and when a pre-existing interaction based value code is not located after a query of the data storage device, alter the authentication sequence at tho a point of entry to the digital content presentation by funneling the digital content requestor from the authentication sequence to the at least one value-centric exercise on the display device;

following receipt of the preferred modes of interaction resulting from completion of the at least one value-centric exercise as selectively determined by the content requestor on the display device during the authentication sequence, generate an interaction based value code incorporating at least each category indicator associated with the preferred modes of interaction as determined by the content requestor, the interaction based value code being made up of a set of discrete category indicators representing the preferred modes of interaction selected by the content requestor with each mode of interaction representing a discrete method of interaction between the content requestor and the digital content presentation resulting from a direct interaction captured from the content requestor during the value-centric exercise, each of the category indicators from the interaction based value code constructed to inform the digital content provider of the content requestor's preferred modes of interaction upon which to base one or more presentation modifications of the digital content presentation, wherein the presentation modifications of the digital content presentation include focusing on presenting based on a score associated with the category indicators;

assigning a content requestor identifier (ID) to the interaction based value code in the data storage device, the content requestor ID being generated during the authentication sequence; and restrict access to the digital content presentation until completion of the value-centric exercise and subsequent generation of the interaction value code.

2. The system of claim 1, wherein:
the processor is further instructed to:
select an access mode to the interaction based value code:
issue a notification to the digital content provider in accordance with the selected access mode; and
deliver the interaction based value code in accordance with the selected access mode to the digital content provider wherein the digital content provider provides the content requestor with access to the digital content presentation in a modified format based on at least one mode of interaction represented in the interaction based value code.

3. The system of claim 1, wherein: the processor is further instructed to select a delivery mode for the interaction based value code from among a plurality of delivery modes and transmit the interaction based value code to the digital content provider in accordance with the selected delivery mode.

4. The system of claim 3, wherein: the delivery mode is selected from a set consisting of one of: an unchanged value code, a tokenized value code, an encrypted value code, or a block data value code.

5. The system of claim 1, wherein:
the interaction based value code is in a form of a progressively ordered set of weighted category indicators selected by the content requestor during the value-centric exercise.

6. The system of claim 1, wherein: the interaction based value code is in a form of an alphanumeric sequence with at least
one letter representative of an interaction value listing set and at least one number associated with the at least one letter representative of a modifier assigned to the interaction value listing set by the requestor.

7. The system of claim 1, wherein: the value-centric exercise includes a plurality of choices among a plurality of the category indicators with each category indicator being displayed with a corresponding interaction value listing set, the category indicators being a codified version of the associated interaction value listing set and incorporated into the interaction based value code.

8. The system of claim 1, wherein: the value-centric exercise is transmitted to the display device of the content requestor as a card sorting exercise from among a plurality of cards with each card depicting a category indicator along with an interaction value listing set.

9. The system of claim 1, wherein: the value-centric exercise is transmitted to the display device of the content requestor as a display including a plurality of interaction value listing sets and a selection of numerical weighting modifiers to be assigned to each interaction value listing set, the modifiers being relative to one another among the selectively assigned interaction value listing sets.

10. The system of claim 1, wherein: the value-centric exercise is transmitted to the display device of the content requestor as a display inducing a plurality of questions and a selection of interaction value listing sets to be selected as responses to the questions, the resulting selection of the interaction value listing sets being transformed into the interaction based value code incorporating the category indicators associated with the selectively assigned interaction value listing sets.

11. The system of claim 1, wherein: the interaction based value code is geolocation independent, requires no prior user history or demographic data to generate, and is transferable between a plurality of third parties.

12. The system of claim 1, wherein: the Blueprint interaction mode category includes sub-category identifiers labeled Stability, Structure, Systems, Planning, Processes, Predictability, Responsibility, Duty, Rules, Credentials, Titles, and Tradition.

13. The system of claim 1, wherein: the Action interaction mode category includes sub-category identifiers labeled Freedom, Flexibility, Spontaneity, Action, Opportunity, Excitement, Attention, Stimulation, Competition, winning, Fun, and Image.

14. The system of claim 1, wherein: the Nurturing interaction mode category includes sub-category identifiers labeled Relationships, Authenticity, Personal Growth, Significance, Teamwork, Involvement, Community, Charity, Ethics, Harmony, Morality, and Contribution.

15. The system of claim 1, wherein: the knowledge interaction mode category includes sub-category identifiers labeled Learning, Intelligence, Logic, Self-Mastery, Technology, Research and Development, Science, Universal Truths, Expertise, Competence, Accuracy, and Big Picture.

16. The system of claim 1, wherein: the interaction value listings are product independent; and each mode of interaction represented by a category indicator in the interaction based value code is selectable as a guide to tailor the digital content presentation by the digital content provider.

17. The system of claim 1, wherein: the content requestor, the digital content provider, and party generating the value-centric exercise and interaction value code are all different parties.

18. The system of claim 1, wherein: the discrete category indicators of the interaction based value code require a linked value profile to decipher, the value profile explaining a meaning of each category indicator as well as the mode of interaction and relevance of a preferred order.

19. A method of capturing interaction value preference based data from a content requestor using a display device during an authentication sequence to a digital content presentation provided by a digital content provider, the method comprising:

providing at least one data storage device storing a universe of interaction value listings and further constructed to store at least one interaction based value code following completion of at least one value-centric exercise by the content requestor;

providing at least one processor in communication with the at least one data storage device and including a non-transitory storage medium having one or more processor executable programming instructions;

invoking a value-centric exercise generation module with the at least one processor to construct an interactive user interface depicting a value-centric exercise grouping together those interaction value listings having a common interaction trait from among the universe of interaction value listings into a plurality of interaction value listing sets with each interaction value listing set defining a distinctive mode of interaction and having a category indicator representative of a respective mode of interaction, the interactive user interface constructed to require the content requestor to selectively assign an order to the interaction value listing sets that aligns with the content requestor's preferred modes of interaction with the digital content presentation;

acquiring a content requestor identifier (ID) from the digital content provider following receipt of a first time request from the content requestor to initiate an authentication sequence to a restricted access digital content presentation provided by the content provider;

querying the data storage device for matching content requestor ID and pre-existing value code;

funneling the content requestor from the authentication sequence and rendering the value-centric exercise on the display device of the content requestor when no pre-existing value code is located in the storage device;

retrieving an order to the preferred modes of interaction resulting from completion of the value-centric exercise as selectively determined by the content requestor on the display device during the authentication sequence, wherein the value-centric exercise presents a choice to determine the order to preferred modes of interaction from among interaction mode categories of Blueprint, Action, Nurturing, and Knowledge on the content requestor's display;

invoking an interaction based value code generation module with the at least one processor to encode category indicators representing the order of the preferred modes of interaction into an interaction based value code, the interaction based value code being made up of a set of discrete category indicators in the order selected by the content requestor resulting from completion of the value-centric exercise and with each mode of interaction representing a discrete method of interaction between the content requestor and the digital content provider through the digital content presentation, each of the category indicators from the interaction based value code constructed to convey information to the digital content provider of the content requestor's interaction preferences upon which to base one or more presentation modifications of the digital content presentation, wherein the presentation modifications of the digital content presentation include focusing on presenting based on a score associated with category indicators;

transmitting a notification to the digital content provider using the processor, the notification including an access mode for accessing the interaction based value code; and granting access to the digital content presentation upon receipt of the interaction based value code and successfully completing the authentication sequence.

20. The method of claim 19, further comprising:
storing a plurality of value profiles in the data storage device with each value profile decoding at least one category indicator of the interaction based value code in the data storage device; and
linking at least one value profile to at least one interaction based value code in the data storage device.

21. The method of claim 19, further comprising: prior to transmitting the interaction based value code to the digital content provider, transforming the interaction based value code into a tokenized format, an encrypted format, or a blockchain element using the processor.

22. The method of claim 19, further comprising:
presenting one or more numerical modifier options to the category indicators for selection by the content requestor during the value-centric exercise.

23. The method of claim 19, further comprising: reviewing the order of the modes of interaction in the interaction based value code established by the content requestor resulting from completion of the value-centric exercise prior to granting access to a third party content provider site; and selecting at least one interaction mode from the interaction based value code to alter an interaction between the content requestor and the digital content presentation.

24. The method of claim 19, wherein: the Blueprint interaction mode category includes sub-category identifiers labeled Stability, Structure, Systems, Planning, Processes, Predictability, Responsibility, Duty, Rules, Credentials, Titles, and Tradition.

25. The method of claim 19, wherein: the Action interaction mode category includes sub-category identifiers labeled Freedom, Flexibility, Spontaneity, Action, Opportunity, Excitement, Attention, Stimulation, Competition, Winning, Fun, and Image.

26. The method of claim 19, wherein: the Nurturing interaction mode category includes sub-category identifiers labeled Relationships, Authenticity, Personal, Growth, Significance, Teamwork, Involvement, Community, Charity, Ethics, Harmony, Morality, and Contribution.

27. The method of claim 19, wherein: the Knowledge interaction mode category includes sub-category identifiers labeled Learning, Intelligence, Logic, Self-Mastery, Technology, Research and Development, Science, Universal Truths, Expertise, Competence, Accuracy, and Big Picture.

28. The method of claim 19, further comprising: selecting at least one of the modes of interaction represented by the category indicators in the value code and tailoring the digital content presentation in accordance therewith.

\* \* \* \* \*

UNITED STATES PATENT AND TRADEMARK OFFICE
CERTIFICATE OF CORRECTION

PATENT NO.            : 11,677,557 B1                                       Page 1 of 1
APPLICATION NO.       : 17/728201
DATED                 : June 13, 2023
INVENTOR(S)           : Cherianne Tree, Omar F. Sayed and Arthur L. McCracken It is certified that error appears in the above-identified patent and that said Letters Patent is hereby corrected as shown below:

In the Claims

Column 25, end of Line 29, please delete the letters "tho".

Signed and Sealed this
Fifteenth Day of August, 2023

Katherine Kelly Vidal
*Director of the United States Patent and Trademark Office*